(12) United States Patent
Ezawa

(10) Patent No.: US 11,061,380 B2
(45) Date of Patent: Jul. 13, 2021

(54) PRODUCTION MANAGEMENT SYSTEM AND PRODUCTION MANAGEMENT METHOD

(71) Applicant: CANON KABUSHIKI KAISHA, Tokyo (JP)

(72) Inventor: Mitsuharu Ezawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 126 days.

(21) Appl. No.: 16/222,830

(22) Filed: Dec. 17, 2018

(65) Prior Publication Data
US 2019/0196442 A1 Jun. 27, 2019

(30) Foreign Application Priority Data

Dec. 26, 2017 (JP) .............................. JP2017-250193
Nov. 19, 2018 (JP) .............................. JP2018-216417

(51) Int. Cl.
*G05B 19/406* (2006.01)

(52) U.S. Cl.
CPC .. *G05B 19/406* (2013.01); *G05B 2219/32181* (2013.01)

(58) Field of Classification Search
CPC ........ G05B 19/406; G05B 2219/32181; G05B 19/41875; G05B 2219/32196; G05B 19/41865; G05B 2219/32252
See application file for complete search history.

(56) References Cited

U.S. PATENT DOCUMENTS

| 7,550,287 | B2 | 6/2009 | Hibino et al. | ............. 435/286.2 |
| 2004/0094630 | A1* | 5/2004 | Tani | .................. G06K 19/06028 235/487 |
| 2005/0158846 | A1* | 7/2005 | Hibino | ................... G06Q 10/08 435/287.1 |
| 2013/0131840 | A1* | 5/2013 | Govindaraj | ...... G05B 19/41865 700/19 |
| 2013/0253718 | A1* | 9/2013 | Meagher | ................ G06N 5/045 700/291 |
| 2014/0299277 | A1* | 10/2014 | Hosaka | ................. H01L 21/677 156/707 |
| 2015/0105887 | A1* | 4/2015 | Troy | ................ G05B 19/41865 700/97 |

(Continued)

FOREIGN PATENT DOCUMENTS

| JP | 2000-066705 | 3/2000 |
| JP | 2001-084305 | 3/2001 |

(Continued)

Primary Examiner — Ziaul Karim
(74) Attorney, Agent, or Firm — Venable LLP

(57) ABSTRACT

A production management system includes a storage unit and a controller. The storage unit is configured to store a holding position at which a first work is held among holding positions of the holding unit including first and second cases respectively capable of holding a plurality of works and a work ID identifying the first work in such a manner that the holding position and the work ID of the first work are associated each other. The controller configured to change information of the holding position associated with the work ID of the first work in the storage unit from a first position to a second position if, within the first case, the first work held at the first position is held anew in the second position different from the first position.

16 Claims, 15 Drawing Sheets

(56) References Cited

U.S. PATENT DOCUMENTS

2015/0352719 A1* 12/2015 Nakazato ........... G05B 19/4183
  700/253
2016/0012361 A1* 1/2016 Sugiyama ........ G06K 19/06037
  705/7.38

FOREIGN PATENT DOCUMENTS

| JP | 2001-273019 | 10/2001 |
| JP | 2004-000119 | 1/2004 |

* cited by examiner

FIG.6

| | | | | | |
|---|---|---|---|---|---|
| 1 OK | 2 OK | 3 OK | 4 OK | 5 OK | 6 OK |
| 7 OK | 8 OK | 9 Gray | 10 Gray | 11 Null | 12 Null |
| 13 Null | 14 Null | 15 Null | 16 Null | 17 Null | 18 Null |

BARCODE/SERIAL No.  CT1554

1 RECEIVING | 2 PROCESSING A | 3 INSPECTION A

| ITEM | VALUE | TOLERANCE | |
|---|---|---|---|
| UNIT NAME | ** INSPECTION UNIT | -- | |
| INSPECTION TIME AND DATE | 2017/xx/xx 01:23:45 | -- | |
| ****SIZE | *** mm | ~ | |
| ****SIZE | ** mm | ~ | |
| *****FLAWS | NONE | ~um | |
| ***FLAWS | NONE | ~um | |

FIG.9A

| | 8 | | | _ □ × |
|---|---|---|---|---|
| BARCODE/SERIAL No. | C950160 | | | 🔍 |

| 1 OK | 2 OK | 3 OK | 4 OK | 5 OK | 6 OK |
|---|---|---|---|---|---|
| 7 OK | 8 OK | 9 OK | 10 OK | 11 Null | 12 Null |
| 13 Null | 14 Null | 15 Null | 16 Null | 17 Null | 18 Null |

| 1 RECEIVING | 2 PROCESSING A | 3 INSPECTION A | 4 PROCESSING B |

| ITEM | VALUE | TOLERANCE |
|---|---|---|
| UNIT NAME | **PROCESSING UNIT #7 | — |
| PROCESSING TIME AND DATE | 2017/xx/xx 12:34:56 | — |
| ****TEMPERATURE | *** °C | ~ |
| ****TEMPERATURE | ** °C | ~ |
| ******TIME | *** sec | ~sec |
| ***FLOW AMOUNT | ** sccm | **sccm~ |

FIG.9B

| | 8 | | | _ □ × |
|---|---|---|---|---|
| BARCODE/SERIAL No. | C950160 | | | 🔍 |

| 1 OK | 2 OK | 3 OK | 4 OK | 5 OK | 6 OK |
|---|---|---|---|---|---|
| 7 OK | 8 OK | 9 OK | 10 OK | 11 Null | 12 Null |
| 13 Null | 14 Null | 15 Null | 16 Null | 17 Null | 18 Null |

| 3 INSPECTION A | 4 PROCESSING A | 5 INSPECTION A | 6 PROCESSING B |

| ITEM | VALUE | TOLERANCE |
|---|---|---|
| UNIT NAME | **PROCESSING UNIT #7 | — |
| PROCESSING TIME AND DATE | 2017/xx/xx 12:43:21 | — |
| ****TEMPERATURE | *** °C | ~ |
| ****TEMPERATURE | ** °C | ~ |
| ******TIME | *** sec | ~sec |
| ***FLOW AMOUNT | ** sccm | **sccm~ |

PRODUCTION MANAGEMENT SYSTEM AND PRODUCTION MANAGEMENT METHOD

BACKGROUND OF THE INVENTION

Field of the Invention

The present invention relates to a production management system and a production management method configured to manage a history of a process in a production line in which the process is executed by using a case capable holding a plurality of works.

Description of the Related Art

Regardless whether a production process is executed automatically by a production unit such as a robot or manually by an operator, a history of the process is recorded per production process for example in a database in a production site such as a factory.

In utilizing such database, a production history is managed not per process but per work in order to be able to refer to a process history of processing and assembling of a specific work for example. Therefore, in order to identify the specific work, there is known a configuration of applying, per work, a peculiar identification code, e.g., a barcode, or an ID tag utilizing a recording device such as an IC chip capable of storing a small amount of data. The use of such ID tag enables to identify the individual work and to refer to information on production and/or process history up to then, i.e., until a previous process, obtained from the database concerning the specific work for example. In such a case, it becomes possible to control and select a post-process and a processing condition after that based on the referred information on the production and/or process history.

While the ID tag is convenient if it can be directly applied to works passing through a process or to articles handled by a system, it is impossible to handle as such depending on articles. For instance, because no ID tag can be directly applied to such objects as cells and microorganisms, Japanese Patent Application Laid-open No. 2004-119 for example discloses a method of applying an ID tag to a container thereof to manage processes such as incubation history. Japanese Patent Application Laid-open No. 2000-66705 also discloses a configuration of collecting production information per pallet by applying an ID tag to the pallet in a case where a same process is executed to a plurality of works loaded on the pallet or the like in pallet unit.

Japanese Patent Application Laid-open No. 2001-273019 also discloses a configuration of managing defect information of works such as electronic parts on a substrate in unit of product production. Japanese Patent Application Laid-open No. 2001-84305 discloses a technology of managing information on working situation per every working process of plural working processes of a worker based on the worker and of displaying the information in a bird's eye view.

There is a case where a plurality of works is stored in a pallet (case or container) to supply, to transfer between processes and to carry out regardless whether types of the works are same or not depending on a production line or a production system. Even in such a case, it is desirable to be able to manage history information of a process or an operation per each individual work by a database. In a case where the process history database is used, it is conceivable to select a process to a specific work corresponding to the process history information of a previous process stored in the database. In such a case, a configuration that enables to refer to the database information through a display output for example is necessary if the operator is required to intervene the selection of the process or a manager or the like is required to confirm a progress situation of the process.

According to the technology disclosed in Japanese Patent Application Laid-open No. 2004-119, because a history of a work (cell) is managed by a barcode applied to container, it is possible to manage the history even through an ID tag cannot be applied directly to the object. However, the technology disclosed in Japanese Patent Application Laid-open No. 2004-119 takes a configuration of using one container per one work because its object is a matter such as a cell. For instance, in a case where a plurality of works is held in one container, no technology is disclosed as to how to manage a history of each individual work. The technology disclosed in Japanese Patent Application Laid-open No. 2000-66705 also presumes to carry out a same process on the plurality of works loaded in the pallet or the like in pallet unit and applies the ID tag to the pallet. That is, this is configuration enables to manage the production information only in the pallet unit. Due to that, it is unable to deal with a case where a production process different per each work within the one pallet is executed for example.

According to the technology disclosed in Japanese Patent Application Laid-open No. 2001-273019, although it is possible to manage quality of the work on the substrate, it is unable to manage a process history of the work produced through a plurality of processes. Still further, according to the technology disclosed in Japanese Patent Application Laid-open No. 2001-84305, it is possible to manage the progress of the process of the work whose production process is different per each work. However, the configuration disclosed in Japanese Patent Application Laid-open No. 2001-84305 cannot deal with the work to which the ID tag cannot be directly applied nor cannot manage the production situation per work in a case where a plurality of works is held in one holding case.

SUMMARY OF THE INVENTION

According to a first aspect of the present invention, a production management system includes a storage unit configured to store a holding position at which a first work is held among holding positions of the holding unit including first and second cases respectively capable of holding a plurality of works and a work ID identifying the first work in such a manner that the holding position and the work ID of the first work are associated each other, and a controller configured to change information of the holding position associated with the work ID of the first work in the storage unit from a first position to a second position if, within the first case, the first work held at the first position is held anew in the second position different from the first position.

According to a second aspect of the present invention, a production management method of managing a history of processes of a plurality of works in a production line in which the processes on the works are executed by using a case capable of holding a plurality of works includes providing a case ID tag physically attached to the case and enabling to identify a specific case, and a work process history database recording a production process history per work, and managing the history of the processes concerning each work by using the case ID identifying the case ID tag recorded in the work process history database and a work ID associated with a holding position of the work within the case.

Further features of the present invention will become apparent from the following description of exemplary embodiments with reference to the attached drawings.

BRIEF DESCRIPTION OF THE DRAWINGS

FIG. 6 is a diagram illustrating one exemplary display area of reference contents of the process history of the embodiment of the present disclosure.

FIG. 9A is a diagram illustrating a display area of the process history in each different workflow of the embodiment of the present disclosure.

FIG. 9B is a diagram illustrating another display area.

DESCRIPTION OF THE EMBODIMENTS

An embodiment of the present disclosure will be described with reference to the attached drawings. It is noted that a configuration described below is one example to the end and can be modified appropriately by a person skilled in the art within a scope not departing a gist of the present disclosure. Numerical values adopted in the present embodiment are also just reference numerical values and do not limit the present disclosure.

Depending on works to be handled in a production system or on products to be manufactured, there is a case where it is not suitable to stamp or to apply an ID tag such as a barcode and an IC chip. For instance, in a production system of an optical product such as an interchangeable lens of a camera, there is a possibility that the peculiar stamp of the identification code or the application of the ID tag such as the barcode and the IC chip to the optical element (lens) may affect performance and quality of the optical product after its assembly. Therefore, it is not preferable to attach the physical ID tag to the optical element (lens) in the production process of the optical product such as the interchangeable lens.

The present embodiment will be described below with an exemplary production of the optical element (lens) or the optical product including the same. In such a case, a plurality of works (optical elements or lenses) to which no ID tags can be directly applied is shifted between processes by being held by one case. The plurality of works held in one case may be what undergoes different production processes per work. A production management system configured to manage a production (process) history and a system for displaying the production (process) history in the production form as described above will be described below in the present embodiment.

Figure 1:
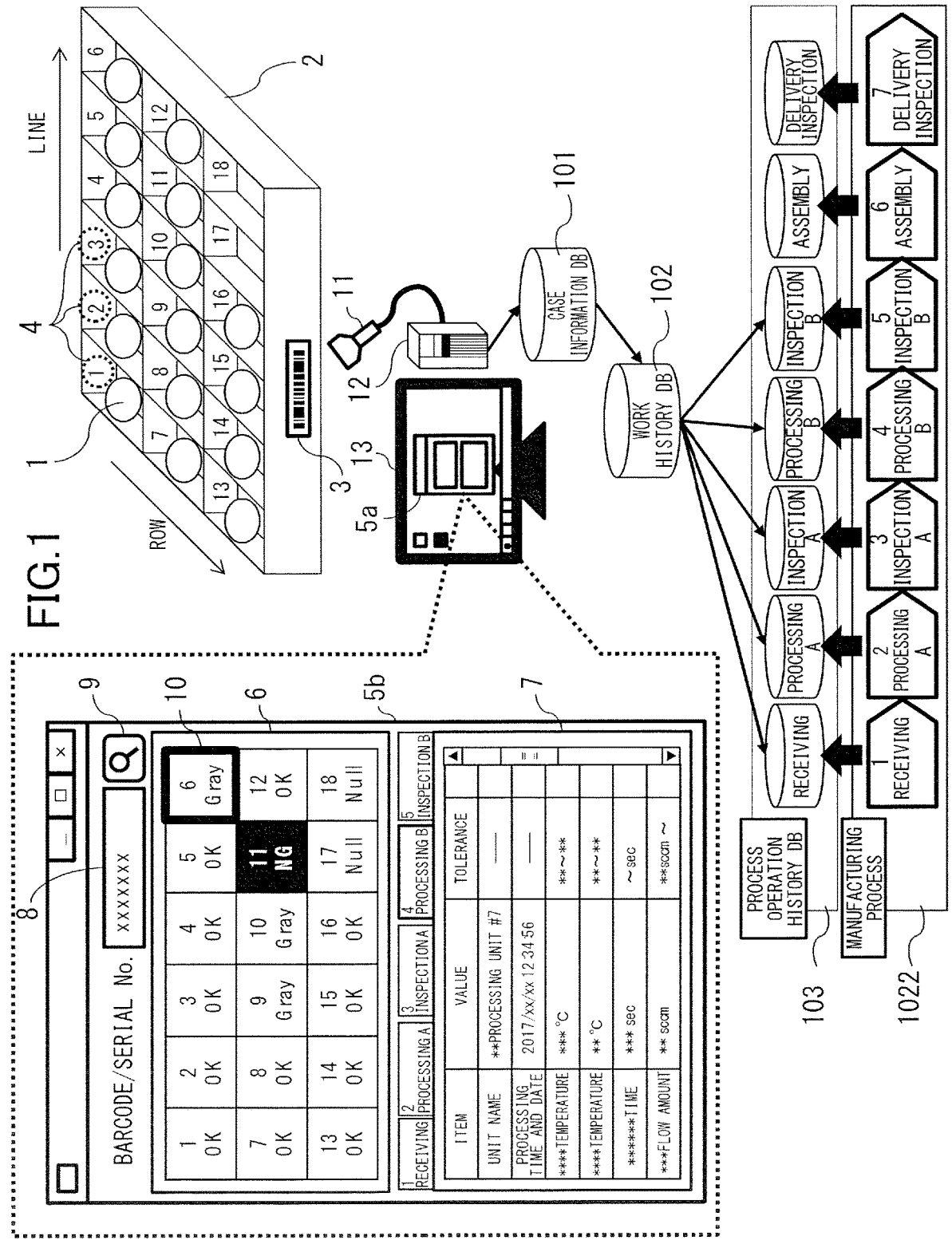
FIG. 1 is a diagram illustrating a production management system and its exemplary display according to an embodiment of the present disclosure.

FIG. 1 illustrates a configuration of process history databases (101 and 102) stored in a storage unit in the production management system of the present embodiment, an inter-process conveyance case 2 storing a plurality of works 1 for use in a manufacturing process 1022 and a monitor 13 displaying history information. Illustrated also in a lower part of FIG. 1 is one example of the manufacturing process 1022 which is an object of the production management.

The manufacturing process 1022 illustrated in FIG. 1 includes respective processes such as "1. Receiving", "2. Processing A", "3. Inspection A", "4. Processing B", "5. Inspection B", "6. Assembly" and "7. Delivery inspection". This manufacturing process 1022 is one exemplary process of receiving ("Receiving") the work which is a lens parent material of the optical elements, of assembling ("Assembling") a lens barrel after undergoing two kinds of processing and inspection processes ("Processing A and B and inspections A and B") and of making delivery inspection (delivery inspection). Presuming mainly such manufacturing process 1022 in the present embodiment, the production management by the process history databases (101 and 102) and the method for displaying the process history during when the production process is in progress will be described. Note that there is a case where the database is abbreviated as 'DB' in the drawings.

As illustrated in the lower part of FIG. 1, the process history of the manufacturing process 1022 is stored and managed in the case information database 101 composing the process history database and per each process of the process operation history database 103 in particular. When each of the processes of the manufacturing process 1022 is executed, a detailed history such as setup conditions, environment and sensor data when the process is executed is stored in the process operation history database 103. For instance, such information as consignor information of the work, lot No., delivery date, results of receiving inspection is stored in the "1. Receiving" process. Such information as an identification name of a processing unit to be used, processing date, processing recipe, processing setup conditions, a state of consumables and sensor history of the unit such as temperature and humidity is stored in the "2. Processing A" process.

The work history database 102 manages a process history per work. For instance, when a production line receives a work, a work history of each individual work is newly prepared and stored in the work history database 102. Every time when a history of each production process is stored in the process operation history database 103, an address (link information) of a history conde of the process operation history database 103 related with the work is additionally described in the work history database 102 in order of processes. It is thus possible to manage the progress of the production process per work and a reference destination of the process operation history database 103.

In the production line of the present embodiment, the plurality of works 1 is conveyed between the production processes by being held by the inter-process conveyance case 2. The case information database 101 constituting the process history database is configured to store intra-case work layout information and information on individual work being held in the inter-process conveyance case 2. The case information database 101 is referred to or is registered and updated when the work is supplied to/discharged out of each process. For instance, the inter-process conveyance case 2 illustrated in FIG. 1 is divided between the works so as to be able to hold the plurality of works 1 and is divided into three lines and six rows in the present embodiment. Thereby, the inter-process conveyance case 2 can hold the plurality of works 1 of up to 18 works.

In the present embodiment, the individual inter-process conveyance case 2 has identification information intrinsic to the case and is attached with an ID tag 3 (case ID tag) enabling to identify the specific case. The ID tag 3 includes a barcode or an IC chip recording identification information intrinsic to the case. This ID tag 3 can apply a unique identification code per each inter-process conveyance case 2. The inter-process conveyance case 2 is attached with the ID tag 3 using a barcode on a side surface thereof in the present embodiment.

The barcode of the ID tag 3 can be read by a barcode reader 11. However, another type ID tag 3 such as an IC chip may be used and may be attached at any position of the inter-process conveyance case 2. For example, a member such as a tag plate to which an intrinsic case No. or the like is applied by a character string may be used as the ID tag 3. In such a case, it is conceivable to configure a reading unit of the ID tag 3 by an image pickup device such as a digital camera or by hardware or software executing OCR process.

It is noted that the reading unit of the ID tag 3, e.g., the barcode reader 11, may be operated manually by an operator or may be operated by automatic operations of a robot unit programmed in advance. Or, a system may be configured such that when the inter-process conveyance case 2 is brought into a predetermined position of the production line, the reading unit of the ID tag 3 disposed in the vicinity thereof automatically detects the ID tag 3 and reads the identification information.

In the present embodiment, such operations as the conveyance of the inter-process conveyance case 2 or the takeout and holding of the work 1 out of/in the case are conducted automatically by a robot unit in the production line. The robot unit (details not illustrated) or its robot controller is what can execute a so-called palletizing process. Virtual palletizing numbers 4 ("1 to 18") are applied to work holding positions (holding unit) the inter-process conveyance case 2 in accordance with a rule of palletizing of the robot unit conducting the automatic conveyance. This palletizing number corresponds to control information controlling the robot unit that handles the inter-process conveyance case 2 or the work 1. The palletizing number 4 is associated with geometry of the case, i.e., array and size of the holding unit. This arrangement makes it possible to generate an operation to a holding position corresponding to another palletizing number 4 through coordinate transformation of a teaching point or the like by teaching an operation to a holding position corresponding to a certain palletizing number 4. This palletizing number is used as a holding position address within the inter-process conveyance case 2 in the present embodiment. Note that it is not always necessary to use the palletizing number as a format of the holding position address within the inter-process conveyance case 2, and a three-dimensional coordinate or the like of a coordinate system having an origin at a predetermined position of the case for example may be used. That is, the format of the holding position address is arbitrary. There is a case where the holding position or the holding position address is called simply as a position in this specification.

FIG. 1 illustrates a computer 12 provided with a monitor 13 as a terminal for making reference to the process history databases (101, 102 and 103). While the monitor 13 and the computer 12 are illustrated in a form of a desktop personal computer in FIG. 1, it is arbitral where the computer 12 is installed and how it is embodied. For instance, the monitor 13 and the computer 12 may be composed of a pad type computer provided with a touch panel or a portable terminal such as a mobile phone. Or, the monitor 13 and the computer 12 may be another type personal computer such as a note type computer or a so-called UMPC. If the monitor 13 and the computer 12 are configured to be portable, an operator managing the production line for example can operate so as to search and to display the process history databased (101, 102 and 103) on the monitor 13 while moving around the site.

Figure 11:
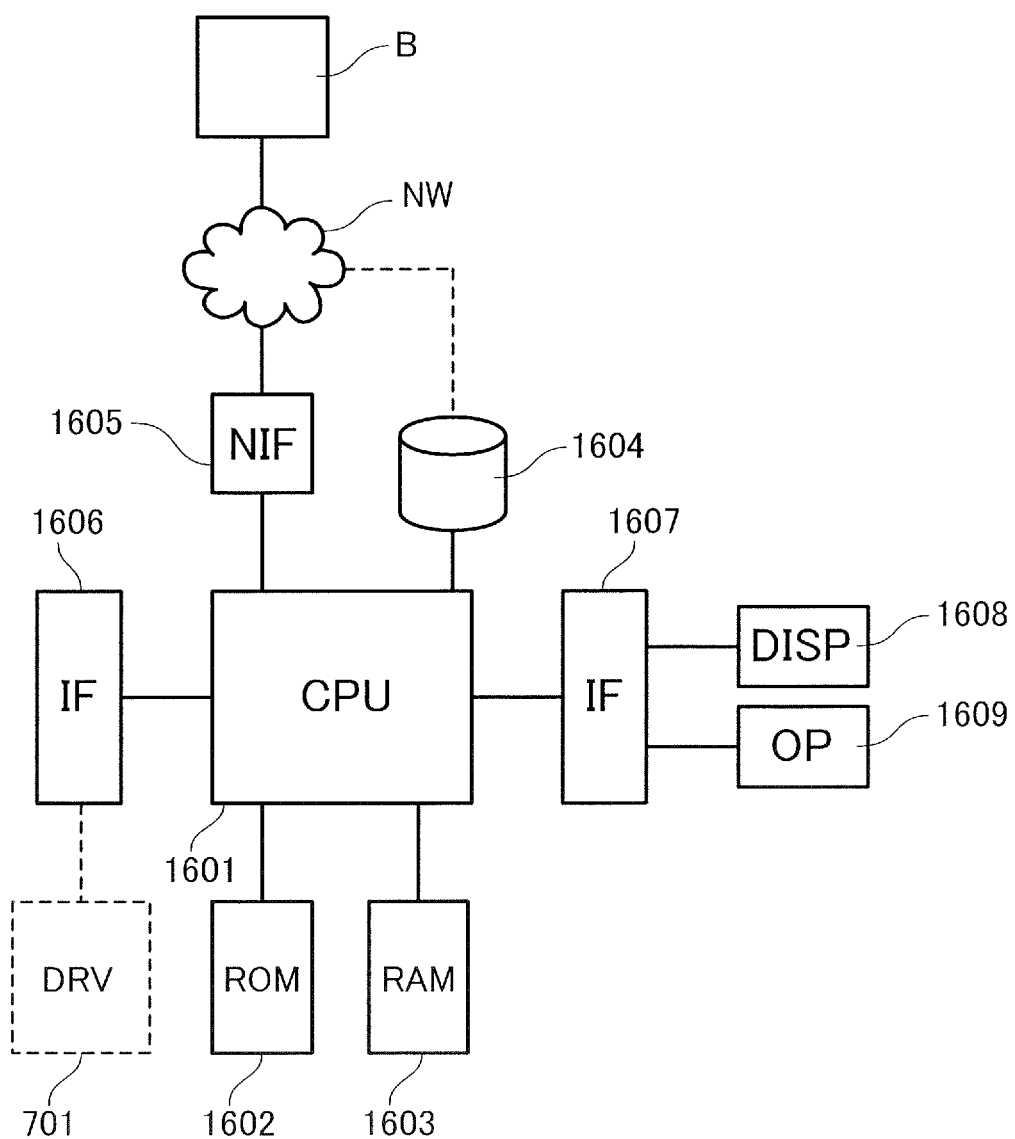
FIG. 11 is a block diagram illustrating an exemplary configuration of a database controller in the production management system of the embodiment of the present disclosure.

Here, FIG. 11 illustrates a hardware configuration of a control system commonly used in the computer 12 provided with the monitor 13 and in the database unit (server) operating the process history databases (101, 102 and 103). As illustrated in FIG. 11, this control system is composed of respective blocks disposed around a CPU 1601. While the control system in FIG. 11 will be described below by exemplifying the configuration of the computer 12 provided with the monitor 13 in FIG. 1, the database unit (server) operating the process history databases (101, 102 and 103) will be additionally described as necessary.

The control system around the CPU 1601 is connected with another unit B through a network NW If the control system around the CPU 1601 is the computer 12 provided with the monitor 13 in FIG. 1, the other unit B may be considered in association with the database unit (server) operating the process history databases (101, 102 and 103). If the control system around the CPU 1601 is the database unit (server) in contrary, the other unit B may be associated with the computer 12 provided with the monitor 13 in FIG. 1.

The control system as illustrated in FIG. 11 is composed of the CPU 1601, a ROM 1602, a RAM 1603 and others as main control units. The control unit in FIG. 11 includes the CPU 1601 serving as a main controller, the ROM 1602 serving as a storage unit and the RAM 1603. A control program and constant information of the CPU 1601 for realizing a control procedure described later can be stored in the ROM 1602. The RAM 1603 is used as a work area of the CPU 1601 in executing a database control procedure illustrated in each drawing described later.

If the configuration in FIG. 11 is that of a terminal for making reference to the database like the computer 12 as illustrated in FIG. 1, this configuration serves as a user interface unit and connects a display 1608 (such as the monitor 13 in FIG. 1) and an operation unit 1609 with an interface 1607. The operation unit (input portion) 1609 may be composed of a full keyboard, a pointing device or the like and composes the user interface for the operator who makes simulations and validations. Or, the display 1608 and the operation unit 1609 may be integrated in terms of hardware such as a touch pad.

The control system in FIG. 11 is provided with a network interface 1605 serving as a communication unit communicating with the other unit through the network NW. The CPU 1601 can send/receive a control signal (packet) necessary for the control of the process history databases (101, 102 and 103) for example through the network NW. The network NW is also utilized in receiving a control signal concerning a progress of a process from a production unit such as a robot unit or a conveyance unit disposed in the production line (system). The network interface 1605 can be configured by the communication standard of cable communication such as IEEE 802.3 or of radio communication such as IEEE 802.11 and 802.15 for example. However, an arbitral communication standard other than those described above may be adopted of course for the network NW.

It is noted that the control program for realizing a control procedure described later of the CPU 1601 may be stored in the storage unit such as an external storage unit 1604 composed of a HDD, a SSD or the like or in an EEPROM domain for example of the ROM 1602. In such a case, the control program for realizing the control procedure described later in the CPU 1601 can be supplied to each storage unit described above through the network interface 1605 to update as a new (other) program. Or, the control program for realizing the control procedure described later of the CPU 1601 can be supplied to various memory units such as a magnetic disk, an optical disk and a flash memory and to each storage unit described above through a drive unit for that end to update its contents. The various storage units in a condition of storing the control program for realizing the abovementioned control procedure of the CPU 1601 constitutes a computer readable storage medium storing the control procedure of the present disclosure.

If the configuration illustrated in FIG. 11 is a control system of a database unit (server) operating the process history databases (101, 102 and 103), a database file recording its database record is stored in the external storage unit 1604. It is noted that the external storage unit 1604 may not be always connected with a hardware interface of the control system of the database unit (server). For instance, the external storage unit 1604 may be composed of a disk unit such as a NAS (network attached storage) and may be connected with the network NW only by hardware.

Here, contents of a display area of the process history displayed on the monitor 13 in FIG. 1 will be described. It is noted that the monitor 13 is one example of a display unit configured to display the holding position of the work in the case as the holding unit in the present embodiment. The exemplary display in FIG. 1 corresponds to what a process history screen 5a of the individual work held in the inter-process conveyance case 2 is read by the computer 12 and is displayed on the monitor 13. A process history screen 5b on the left side in FIG. 1 is what the process history screen 5a in the monitor 13 at the center of FIG. 1 is enlarged and displayed. In this example, the process history screen 5b is composed of a case identification number display portion 8 into which an individual identification number of the inter-process conveyance case can be inputted and displayed, an intra-case work layout display portion 6 in the inter-process conveyance case and a process history display portion 7 displaying a process history of each work.

A barcode number is displayed on the case identification number display portion 8 of the monitor 13 by reading the ID tag 3 (barcode) applied to the inter-process conveyance case 2 by a barcode reader 11. Then, based on this barcode data, it is possible to search individual information of the inter-process conveyance case 2 from the case information database 101. It is also possible to obtain "work layout information within the inter-process conveyance case" and "information of each individual stored work" from the case information database 101 from the individual information of the inter-process conveyance case 2.

Then, based on the "work layout information within the inter-process conveyance case" thus obtained, the work layout, which is a layout of the entire case including the holding position, can be displayed on the work layout display portion 6. In this example, the work layout display portion 6 displays a composition of three lines and six rows corresponding to the layout of eighteen holding positions of the case. It is noted that in a case where the geometry of the holding positions of the inter-process conveyance case 2 is different, another arbitrary form corresponding to that may be used for the work layout display portion 6. In the present embodiment, each of some display cells corresponding to each holding position of the three lines and six rows of the work layout display portion 6 indicates a palletizing number (1 to 18) corresponding to a case holding position address.

A display configured as a touch panel or a pointing device such as a mouse and a track pad not illustrated are used together for the monitor 13 to be able to make a selection operation to a part of the individual work or of the holding position of the work layout display portion 6. A work selected by the work layout display portion 6 is highlighted (thick frame 10 in FIG. 1).

It is also possible to search a corresponding work process history from the work history database 102 based on the information of the individual held work obtained from the case information database 101. It is also possible to obtain a reference destination of the process operation history database 103 per peculiar work. Thereby, it is possible to obtain a process operation history of the selected work 10 selected by the work layout display portion 6 from the process operation history database 103 and to display it on the process history display portion 7. The process history on the work corresponding to the selected holding position (10) selected by the work layout display portion 6 in FIG. 1 is displayed on the process history display portion 7.

The display of the process history display portion 7 is configured so as to be able to switch display contents by an operation made to its upper tab (manufacturing process "1. Receiving", "2. Processing A", "3. Inspection A", and so on). Accordingly, it is possible to refer to progressed process contents in order of the production processes on the display of the process history display portion 7 by sequentially operating the tabs. Still further, the tabs of the process history display portion 7 are generated and displayed only for the progressed processes. For example, it can be seen from the exemplary display in FIG. 1 that the work whose palletizing number '6' selected by the work layout display portion 6 has progressed to the rightmost tab of the process of "5. Inspection B". A detailed history of the production process selected by switching the tabs is displayed as a list.

It is also possible to change the display mode between an item within an allowable range of a predetermined process condition set in advance and an item without the allowable range (information on abnormality). In this case, it is possible to change the display mode by using display colors (color codes by at least two colors or more) and concentration (switching of concentrations in the same manner). For example, such selection of the display mode can be made based on a result obtained by comparing an allowable value of the process condition set in advance with the process history data of a specific process of a specific work stored in a specific holding position address of the case.

In the work layout display portion 6, a display cell of a work within the allowable range of the predetermined process condition within all items of all production process is categorized and displayed as "OK", a work not within the allowable range partially is displayed as "Gray" and a clearly defective work is displayed as "NG". In such a case, the classification of "OK" (good product for example), "Gray" (product between good and defective products for example) and "NG" (defective product for example) is displayed by the different display mode, e.g., the color coding, on the work layout display portion 6. The work not partially within the allowable range and the work of the clearly defective product may be displayed to be abnormal supposing that abnormal information is included. Still further, the holding position addresses (display cells of palletizing numbers 17 and 18) where no work exists within the inter-process conveyance case as illustrated in FIG. 1 are displayed as "Null" meaning that there exists no work. It is noted that, if a process condition is changed, the abnormal indication may be displayed at a holding position (the display cell of the work) which is associated with a work ID associated with process information executed to a work before the process condition is changed.

It is also possible to search the individual information of the inter-process conveyance case 2 by directly inputting the barcode number of the inter-process conveyance case 2 to the case identification number display portion 8 and by operating a search button 9. Even if the inter-process conveyance case 2 is not at hand, it is possible to refer to the progress of the production process and the process history of the individual works held in the inter-process conveyance case if the barcode number is known.

Figure 2:
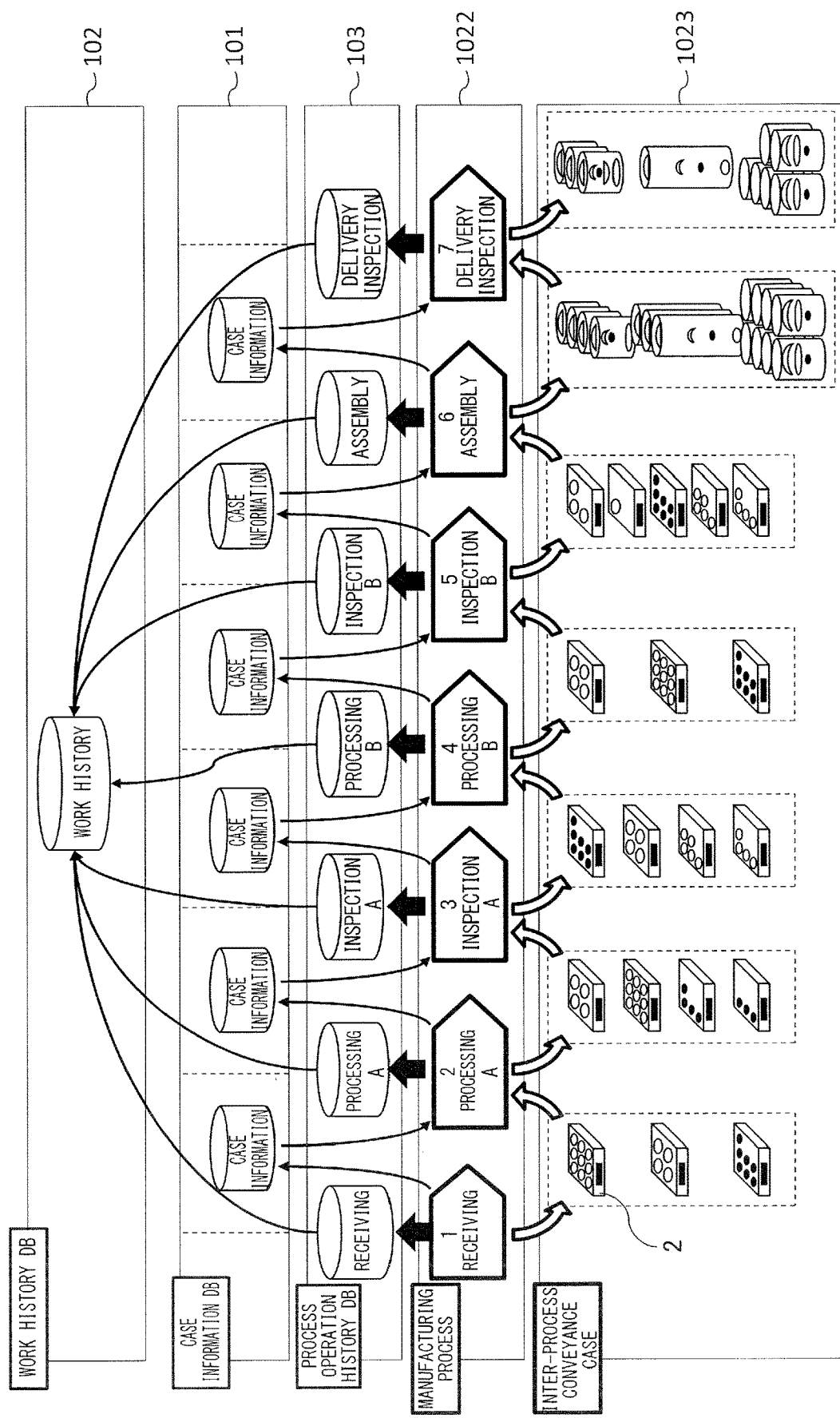
FIG. 2 is a diagram illustrating an outline of the production management system of the embodiment of the present disclosure.

Next, an exemplary configuration of the production management system of the present embodiment will be described with reference to FIG. 2. In FIG. 2, each of the manufacturing processes (1022) is carried out while conveying the works held in the inter-process conveyance case 2 in the various holding modes among the respective production processes. The manufacturing processes (1022) illustrated in FIG. 2 are the same with a flow of the manufacturing processes (1022) of the optical products illustrated in FIG. 1.

The works held in the supplying inter-process conveyance case 2 are supplied to each of the manufacturing processes (1022) and are taken out of the supplying inter-process conveyance case such that each process is sequentially executed. In such a case, if an operation of returning the work to the previous process as a result of inspection to process again or of removing a defective work that does meet with a standard exists, there is a case where a number of works stored in the supplying inter-process conveyance case differs from a number of works stored in a discharging inter-process conveyance case (1023). After finishing each production process, the works are held in the discharging inter-process conveyance case (2) and are conveyed to the next process (1023). The works are taken out of the inter-process conveyance case (2) conveyed from the previous process in the same manner also in the next process to execute the next process.

The process history database includes the case information database 101, the work history database 102 and the process operation history database 103 also in FIG. 2. The process operation history database 103 storing the history per each process composing the manufacturing process (1022) is managed per every production process by hardware such as a database storage unit, the database computer (server) and the like. The hardware for managing the database may be installed at other production factories, respectively, for example.

The work history database 102 and the case information database 101 are connected through a network not illustrated for example. In such a case, the work history database 102 is made accessible from the all processes, and the case information database 101 is made accessible at least from each conveyance process.

The process operation history database 103 storing the history per each process is disposed in each process of "1. Receiving", "2. Processing A", "3. Inspection A" and so on of the manufacturing process (1022). Then, when each process is executed, detailed history data such as a setup condition, environment, and sensor data at the time when the process is executed is accumulated and is stored in the process operation history database 103.

When the history of each manufacturing process is stored in the process operation history database 103, an address (link information) of the database record of the work within the process operation history database 103 is additionally recorded in the work history database 102 in order of the processes. Teaching data or the like required for automatic conveyance and assembly of the production unit such the robot unit is registered in the case information database 101 besides the intra-case layout information and information on each individual work corresponding to the holding position within the case of the inter-process conveyance case 2.

Next, an internal configuration of the work history database 102, the case information database 101 and the process operation history database 103 illustrated in FIG. 2 will be described.

Figure 3:
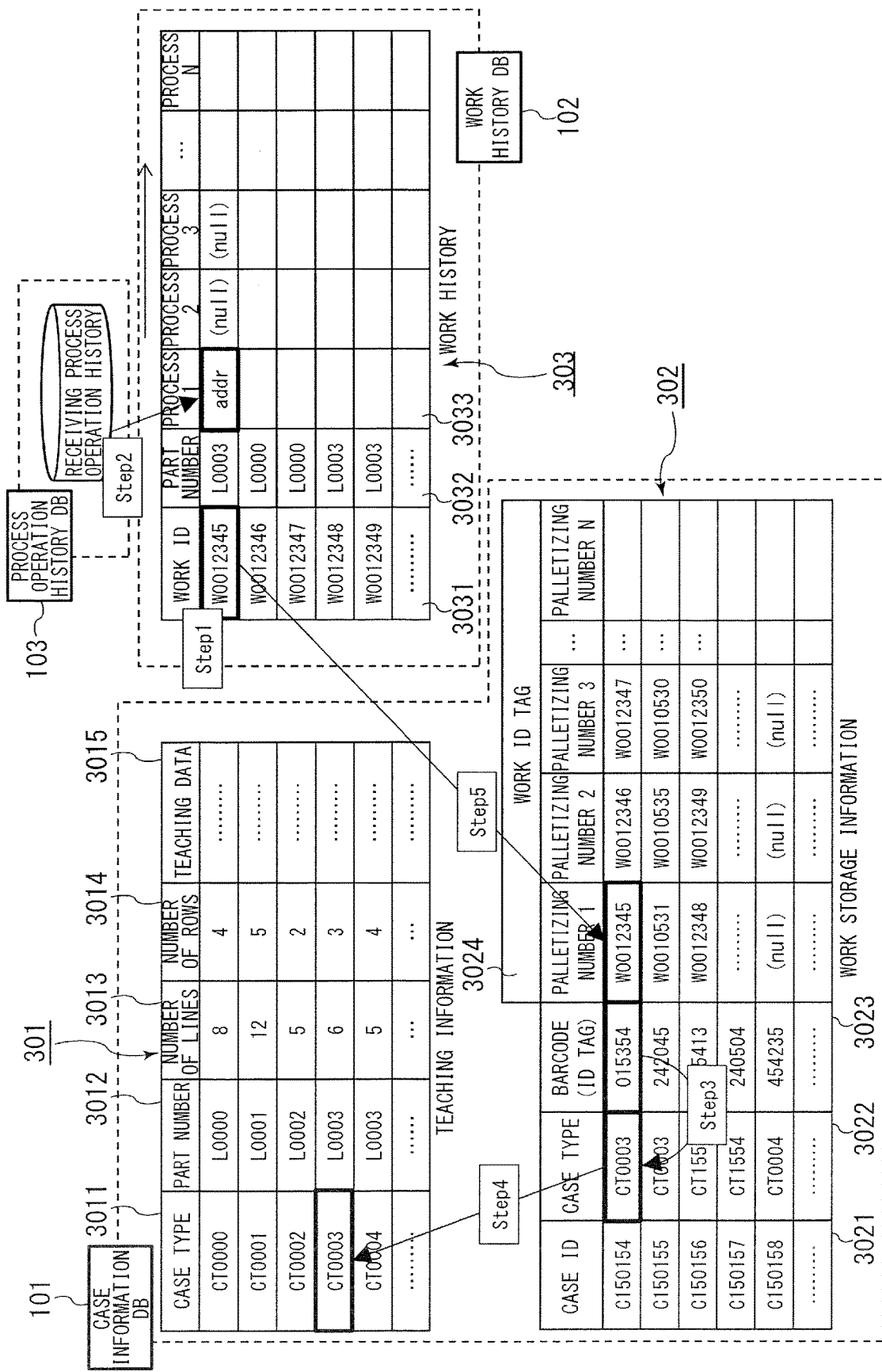
FIG. 3 is a diagram illustrating a database configuration in the production management system of the embodiment of the present disclosure.

FIG. 3 illustrates an exemplary database configuration of the present embodiment of the present disclosure. Teaching information 301 and work holding information 302 are registered in the case information database 101. A type of the case (3011), a title of a part number of the work to be held in the case (3012), numbers of lines and rows (3013 and 3014) of the inter-process conveyance case 2 required for the above-mentioned palletizing of the robot unit, teaching data (3015) and others are registered in the teaching information 301.

A case ID (3021) of each individual inter-process conveyance case, a type of the case (3022), and a barcode (3023) of the ID tag attached to the case are registered in the work holding information (work stored information) 302. A work ID (3024) of the work held in each holding position (palletizing number) of the case of the record is also registered in the work holding information 302.

A work ID (3031) and a title of a part number (3032) of the work are registered for each individual work in the receiving process in the work history 303. Then, every time when each production process is executed for the work, an address (addr: link information) of the process operation history database 103 is additionally recorded in order of processes such as "process 1", "process 2" and so on. Note that the address of the process operation history database 103 is often abbreviated as "addr" within the drawings. It is noted that an enough and sufficient number of processes that can be registered in the database is assured based on the number of production processes of the work.

Next, a database control for associating the receiving process operation history with a holding position of a work after storing the receiving process operation history in the "1. Receiving" process of the manufacturing process illustrated in FIG. 2 will be described with reference to FIG. 3. In FIG. 3, steps of the database control procedure are denoted by reference numerals like "Step 1", "Step 2" and so on (the same applies to the attached drawings of the same format described later).

At first, corresponding to carry-in of the work into the production line, a work ID "W0012345" (field 3031) and a part number name "L0003" (field 3032) are newly registered in the work history database 102 in the "1. Receiving" process in Step S1.

Next, information on a consignor of the work and information on a lot number, a delivery date, a receiving inspection result and others are stored in the process operation history database 103. Then, the address (link information) of the record stored in the process operation history database 103 concerning the work is recorded in the field (3032) of the "process 1" of the work ID "W0012345" in Step S2.

Next, in holding the work in the inter-process conveyance case, the barcode (field 3023) of the ID tag 3 attached to the case is read by the barcode reader 11 (FIG. 1) to specify the type of the case "CT0003" (field 3022) into which the work is to be held in Step S3.

Further, a reference is made to the case information database 101 from the case "CT0003" (field 3022) to obtain information such as numbers of lines and rows and teaching data (3013, 3014 and 3015) necessary for palletizing of the case in which the work ID "W0012345" is stored. That is, a configuration of each holding position of the case, teaching data for handling the work held in each holding position of the case, the palletizing number and others are obtained in Step S4.

In succession, in a case where the work of the work ID "W0012345" is held in the palletizing number "1" of the inter-process conveyance case 2, the work ID "W0012345" is registered in the palletizing number "1" of the work holding information 302 in Step S5.

It is possible to associate the place (palletizing number) where the individual work is stored with its work ID by repeating this registration every time when the held work is held in the inter-process conveyance case in the same manner also on the palletizing number "2" and after.

Figure 4:
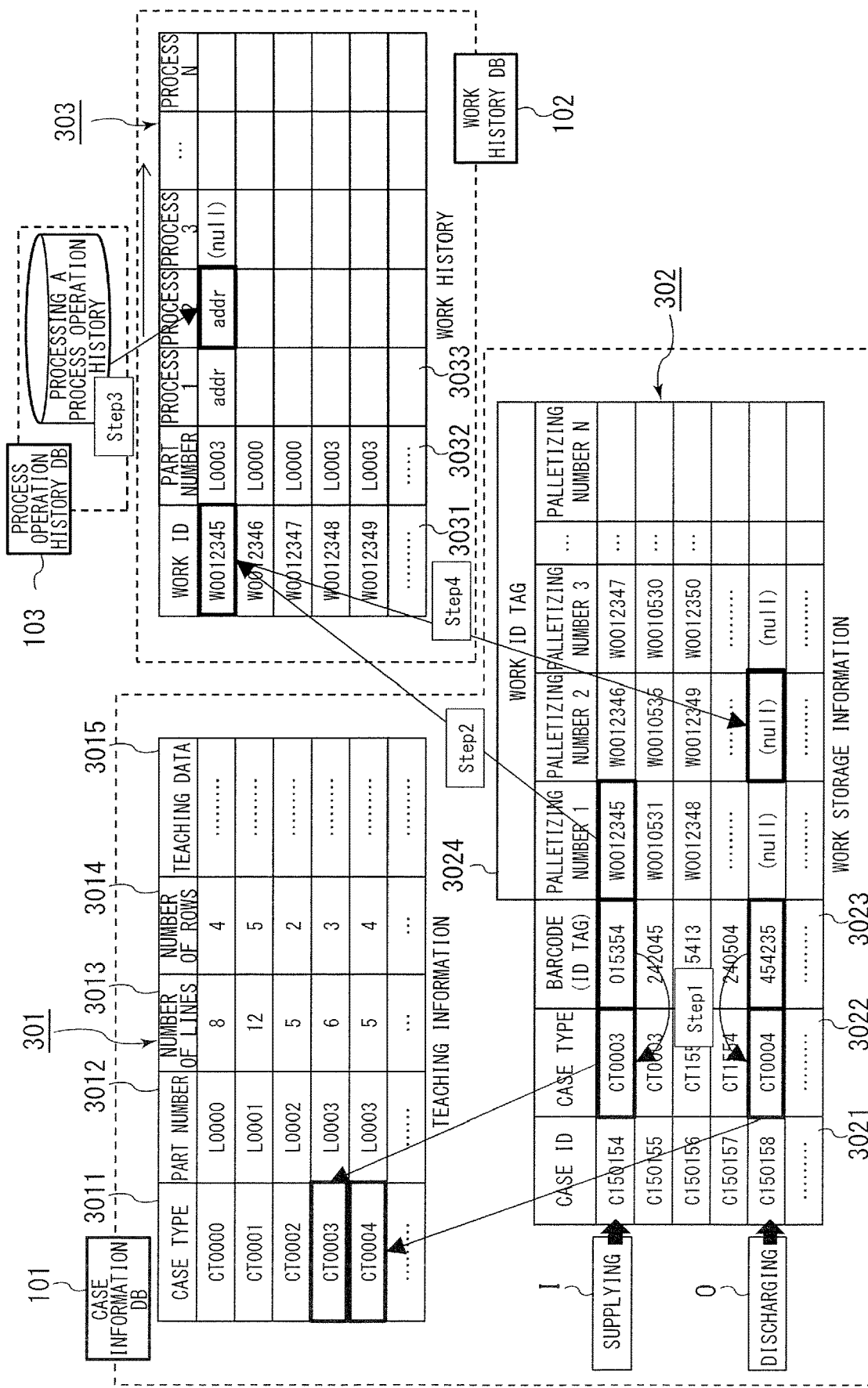
FIG. 4 is a diagram illustrating a database manipulation in supplying to and discharging from a conveyance case of the embodiment of the present disclosure.

Next, a process from when the inter-process conveyance case 2 in which the work is held in the "1. Receiving" process in the manufacturing process as illustrated in FIG. 2 is supplied to the next process of the "2. Processing A" until when it is discharged will be described by making reference to FIG. 4. That is, this case is the database control in supplying and discharging the work to/out of the inter-process conveyance case 2. FIG. 4 illustrates an exemplary operation of the database of the process in supplying and discharging the work to/out of the inter-process conveyance case 2 in a format similar to that in FIG. 3 and by using the same reference numerals.

In the work holding information 302 in FIG. 4, a supplying (I) inter-process conveyance case and a discharging (O) inter-process conveyance case are registered in the case information database 101 as a case ID "C150154" and a case ID "C150158", respectively.

In the palletizing number "1" of the case ID "C150154" of the supplying (I) inter-process conveyance case, the work ID "W0012345" held at that position (first position) is registered. Still further, because no work is held yet in the discharging (O) inter-process conveyance case, a condition in which no work ID is registered in the palletizing number of the case ID "C150158" will be described.

At first, the barcodes are read by the barcode reader 11 from the ID tags of the supplying (I) inter-process conveyance case and the discharging (O) inter-process conveyance case. Then, a reference is made to the case information database 101 and the work holding information 302 from the case type "CT0003" and "CT0004" to obtain teaching position of the individual holding positions and the palletizing numbers within the case in Step S1.

In succession, in taking the work out of the palletizing number "1" (first position) of the supplying (I) inter-process conveyance case, the work ID "W0012345" is obtained based on the work holding information 302 of the supplying (I) inter-process conveyance case. When the work is taken out of the case, the registration of the work ID of the palletizing number "1" of the case ID "C150154" of the supplying inter-process conveyance case is deleted in Step S2.

When the process of the "processing A" is executed on the taken out work, the used process history such as the identification name of the processing unit, the processing date, the processing recipe, the processing setup condition, the condition of the consumable part and the sensor history of the unit (such as temperature and humidity) is stored in the process operation history database 103 of the processing A. Then, addresses of these process history records stored in the process operation history database 103 are recorded at a position (3033) of the "process 2" of the work ID "W0012345" in Step S3.

Next, in holding the processed work in the discharging inter-process conveyance case, the work ID "W0012345" is registered in the palletizing number (third position) holding the work of the discharging (0) case ID "C150158" in the work holding information 302 in Step S4. It is noted that at this time, the discharging process may be changed by changing the discharging palletizing number or by assigning to a plurality of discharging (O) inter-process conveyance cases. In such a case, a holding position to another inter-process conveyance case different from that illustrated in the drawing is recorded in the database in the same manner as described above. This example illustrates a case where the processed work is held in a palletizing number "2" of the plurality of discharging (O) inter-process conveyance cases. Still further, as for the discharging case, the work may be held in a different position (second position), e.g., a palletizing number "10", of the case "C150154" which is the same with the supplying case "C150154".

After that, addresses in the entire process operation history database 103 are registered in the work history of the work ID "W0012345" by repeating the similar database registration also for the processes on and after the "2. Processing A" of the manufacturing process as illustrated in FIGS. 1 and 2. Then, after the "7. Delivery inspection" process, the work ID "W0012345" is registered in the palletizing number of the case ID of the case by which the work is held and is delivered. For example, even in a case where different types of optical elements are assembled like a lens barrel, it is possible to register different work IDs of the optical elements in palletizing numbers of the case ID of the lens barrel by the similar database operation. It is noted that in a case where another work is to be held at the position of the palletizing number "1" after when a work which has been held in the palletizing number "1" is held at another position, a new work ID is applied to the palletizing number "1" as a first position of the first case. Then, while being associated with each other, the other work and the newly applied work ID are stored in the server.

Figure 5:
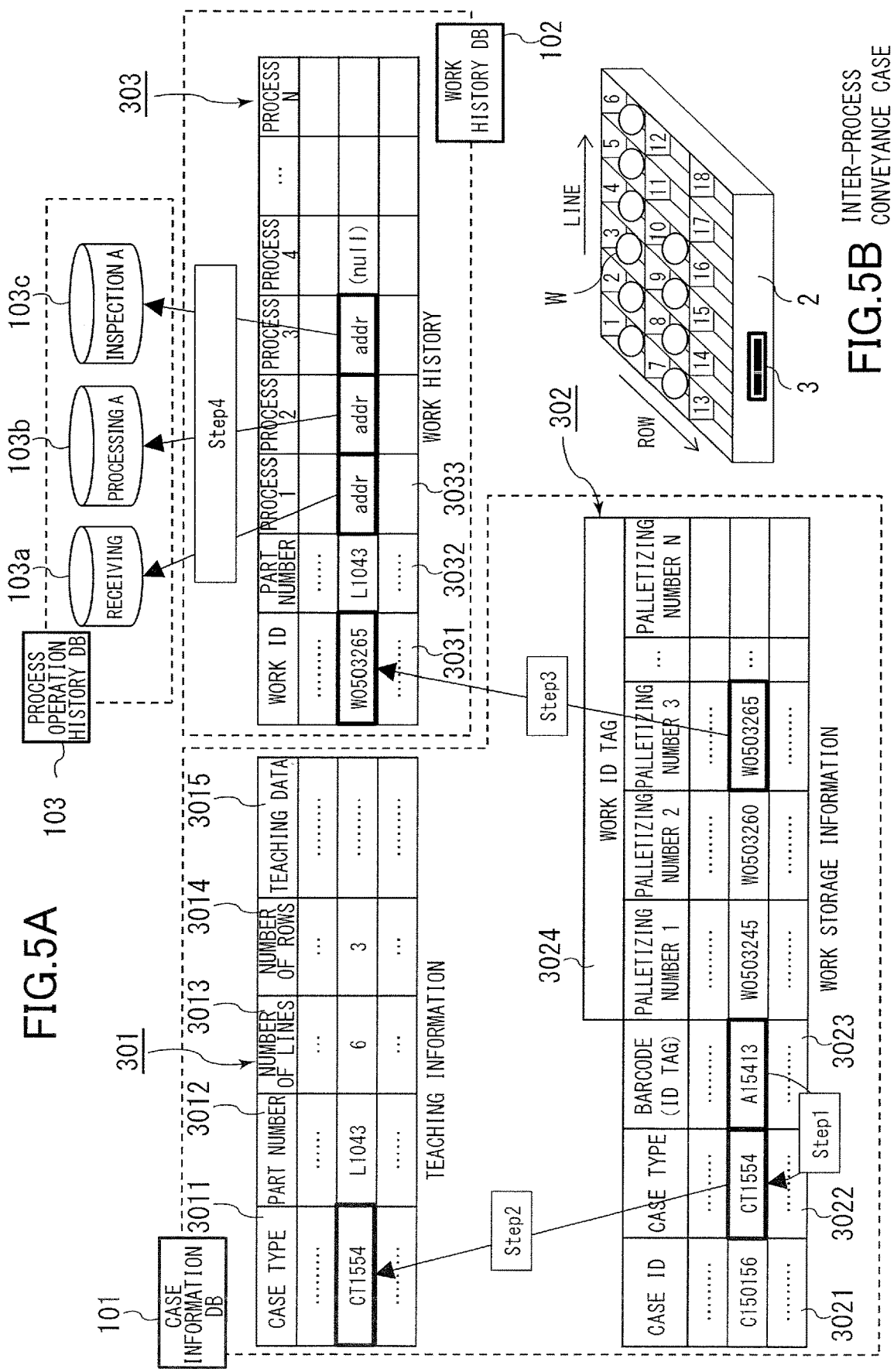
FIG. 5A is a diagram illustrating a reference method of a process history of the embodiment of the present disclosure.
FIG. 5B is a perspective view illustrating an inter-process conveyance case and works used in the embodiment.

Next, a method for making reference to the individual process history per work of the present embodiment will be described with reference to FIGS. 5 and 6. Here, a case where a reference is made to each process history of the "1. Receiving", "2. Processing A" and "3. Inspection A" up to then after the process of the "3. Inspection A" of the production management system as illustrated in FIG. 1 will be exemplified.

FIGS. 5A and 5B illustrate a method for referring to the process history of the present embodiment. FIG. 5A illustrates a database configuration with a format similar to that illustrated in FIGS. 3 and 4. FIG. 5B illustrates a state in which works are held in the inter-process conveyance case 2 after the process "3. Inspection A". FIG. 6 illustrates a display area referring to the process history of the present embodiment.

For example, a reference is made here to the process history of the work W held in the inter-process conveyance case 2 as illustrated in FIG. 5B after the process "3. Inspection A". A display in FIG. 6 displays the process history information obtained by the operations as described above and illustrated in FIG. 1 on the screen. A state in which the palletizing number "3" (the holding position of the work W in FIG. 5B) is selected in an initial condition will be exemplified. A database control in FIG. 5A will be described below with reference numerals as Step S1, Step S2 and so on similarly to the cases in FIGS. 3 and 4.

In the database control in FIG. 5A, the ID tag 3 of the inter-process conveyance case 2 in which the work W whose process history is to be referred is held is read at first by the barcode reader 11. Then, its case type "CT1554" is displayed on the case identification number display portion 8 in FIG. 6 in Step S1.

Then, the teaching information 301 in FIG. 5A is searched from the obtained case type "CT1554" to read a pertinent number of lines (field 3013), a number of rows (field 3014) and teaching data (field 3015) and to display on the work layout display portion 6 in FIG. 6 in Step S2.

If the palletizing number "3" corresponding to the holding position of the work W (FIG. 5B) is selected on the work layout display portion 6, the work holding information 302 is searched based on the palletizing number. Then, the work ID "W0503265" registered in the palletizing number "3" is obtained, and based on that, the pertinent process history data record is searched from the work history 303 in Step S3.

As for the work ID "W0503265", the history up to the "process 3" is registered. Then, a reference is made to the database of processes of Receiving (103a), Processing A (103b) and Inspection A (103c) or the like constituting the process operation history database 103 by the work ID "W0503265". This operation makes it possible to obtain a process name for example, so that tabs of the process history display portion 7 of FIG. 6 are displayed in order of the processes. Still further, it is possible to obtain the process history per process executed on the work ID "W0583265" based on the reference result of the same database. For instance, details of each process history is read from the process operation history database 103 and is displayed on the process history display portion 7 by using addresses (link information) referring to the databases of Receiving (103a), Processing A (103b) and Inspection A (103c) or the like in Step S4.

Even in a case where a more number of manufacturing processes are being executed, it is possible to obtain the process history per work and the history data related to a process progress condition from the process operation history database 103 and to display in the same manner with that in FIG. 6 by the control similar to what described above.

Figure 7:
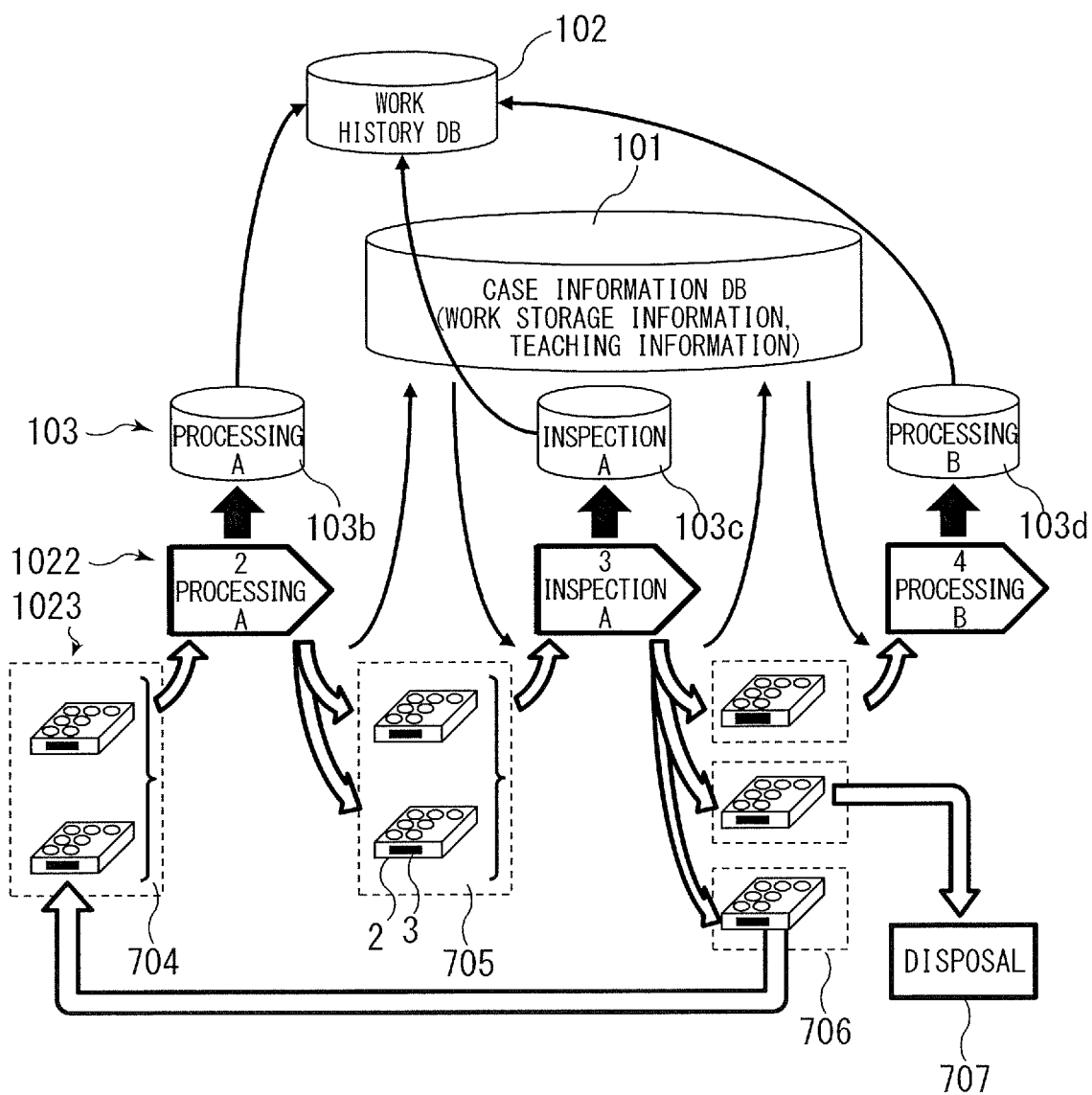
FIG. 7 is a diagram illustrating workflows in a case where a production process differs per work of the embodiment of the present disclosure.

Next, a control made in a case of managing a production history of a work whose production processes are different per each work will be described with reference to FIGS. 7, 8, and 9A and 9B. FIG. 7 illustrates an exemplary workflow in which the production process is different per each work in the present embodiment. FIG. 7 illustrates the manufacturing process (1022) in FIG. 2 and the "2. Processing A", the "3. Inspection A" and the "4. Processing B" corresponding to parts of handling (1023) of the inter-process conveyance case (2).

The handlings (1023) of the inter-process conveyance case (2) are denoted by respective reference numerals of 704, 705 and 706 between the respective processes.

In this manufacturing process (1022), after the "2. Processing A" process, the "3. Inspection A" process is carried out. If the work passes (OK) through the inspection, it is held in the supplying (I) inter-process conveyance case 2 of the "4. Processing B" to advance to the "4. Processing B" (uppermost inter-process conveyance case in 706).

A work which has been NG in the "3. Inspection A" is processed again in the "2. Processing A". For instance, a work in a level that might become OK in the inspection after being processed again in the "2. Processing A" is held again in the supplying (I) inter-process conveyance case of the "2. Processing A" and is returned to the "2. Processing A" process (lowermost inter-process conveyance case in 706).

Still further, a work improbable to become OK in the inspection even if it is processed again in the "2. Processing A" process among the works which have been NG in the "3. Inspection A" process is held in a disposal inter-process conveyance case in a middle of 706. A work which has been processed twice (or more) for example in the "2. Processing A" is also held in the disposal inter-process conveyance case. The disposal inter-process conveyance case in the middle of 706 is sent to a disposal process (707).

The process history of each process (1022) is recorded in each database of Processing A (103b), Inspection A (103c) and Processing B (103d) of the process operation history database 103. The abovementioned replacement among the inter-process conveyance cases and the proper use of the cases related to the change of the process are managed by the case information database 101. The replacement to the inter-process conveyance case and the proper use of the cases can be achieved by the robot unit or the like. In such a case, based on control information for controlling palletizing operation of the robot unit, the pertinent case ID in the case information database 101 and the palletizing number (holding position within a case) are updated to contents corresponding to the replacement and the proper use of the cases.

Figure 8:
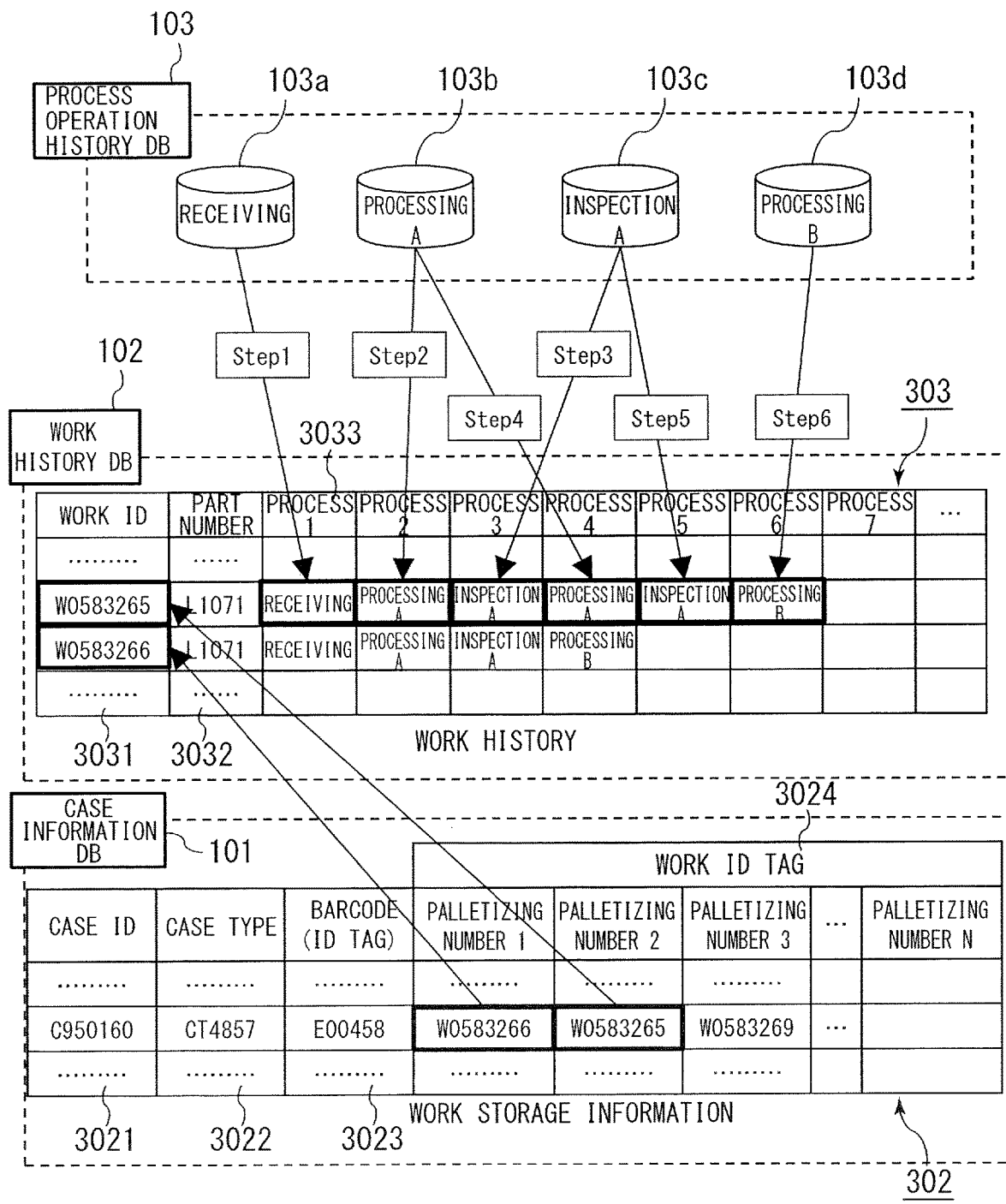
FIG. 8 is a diagram illustrating database contents in the case where the workflows are different of the embodiment of the present disclosure.

Next, in a case where the workflow of the production process is different per work as illustrated in FIG. 7 for example, a database control related to the process operation history database 103, the work history database 102 and the case information database 101 is executed as illustrated in FIG. 8. FIG. 8 illustrates a state of the database control of the process history databases (101, 102 and 103) in the same format with those illustrated in FIGS. 3 and 5A.

Here, FIG. 8 illustrates a state how production processes of two works of the work ID "W0583266" and the work ID "W0583265" respectively stored in two holding positions of palletizing numbers "1" and "2" of a certain case (case ID "C950160") advance. The state of the progress of the process is denoted by reference numerals Step S1 through Step S6.

In FIG. 8, the work of the work ID "W0583266" has passed (OK) through the "3. Inspection A" process illustrated in FIG. 7 in a first time and advances to the "4. Processing B" without returning to the process (field 3033 of each process of the work history database 102). Meanwhile, the work of the work ID "W0583265" is what is processed in the "2. Processing A" process again after the "3. Inspection A" process and is passed (OK) through the "3. Inspection A" of the second time and is completed up to the "4. Processing B" process.

Even in a case where the "2. Processing A" and the "3. Inspection A" processes are executed twice like the case of the work of the work ID "W0583265", an address in the process operation history database 103 is additionally recorded in the work history database 102 in order of the processes every time when the production process is executed.

Then, after finishing to execute Step S1 through Step S6, the process history is registered in the work history database as illustrated in FIG. 8. It can be seen that registered numbers of addresses of the process operation history database 103 are different with regard to the work ID "W0583266" and the work ID "W0583265" for which numbers of executed production processes are different in the state illustrated in FIG. 8.

It is noted that in this example, among the works of the work ID "W0583266" and the work ID "W0583265", the work of the work ID "W0583265" has passed a more number of processes and has passed the "2. Processing A" and the "3. Inspection A" twice. However, even in that stage, the works of the work ID "W0583266" and the work ID "W0583265" are stored in the palletizing numbers "1" and "2", respectively, of the inter-process conveyance case (2) having the same case ID "C950160".

The process histories of the works whose data have been registered as illustrated in FIG. 8 are displayed on the monitor 13 illustrated in FIG. 1 in a display mode as illustrated in FIGS. 9A and 9B for example so that the operator or the manager can make reference. FIGS. 9A and 9B illustrate exemplary process history display areas in the case where the workflows differ per work as illustrated in FIGS. 7 and 8. These exemplary displays correspond to a state in which the case ID "C950160" is assigned by the case identification number display portion 8 for example after when the processes have progressed as illustrated in FIG. 8.

FIG. 9A illustrates a process history display area when the palletizing number "1" of the inter-process conveyance case (2) having the case ID "C950160" is selected, and FIG. 9B is a process history display area when the palletizing number "2" is selected. The works of the work ID "W0583266" and the work ID "W0583265" are held in their holding positions, respectively.

Because the tabs of the process history display portion 7 are arrayed in the order of the production processes as described above in FIGS. 9A and 9B, it is possible to know the progressed production process history by watching the display of the tabs in a case where the production processes are different among the palletizing numbers "1" and "2" as illustrated in FIG. 8. The operator or the manager can also display the detailed process history of the tab by selecting the tab of the process history display portion 7. Still further, the work of the work ID "W0583265" of the palletizing number "2" has gone through the workflow different from that of the work of the work ID "W0583266" of the palletizing number "1". Accordingly, the display modes of these two works may be differentiated from each other in the work layout display portion 6 and the process history display portion 7. In such a case, as for the work of the work ID "W0583265", a display color for example of the display cell of the pertinent work layout display portion 6 and the process history display portion 7 are differentiated from those of the work of the work ID "W0583266". This arrangement makes it possible to highlight the identification information and the process history of the work of the work ID "W0583265" that has gone through the processes different from the normal processes.

It is also possible to make reference to the updated newest process operation history because the address (link information) of the history record of the process operation history database 103 of the work is described in the work history database 102. Therefore, even if a defective work is flown to the post-process due to a processing setup error or the like, this arrangement makes it possible for the operator or the manager of the post-process to refer to that the pertinent work is the defective work at a point of time when the process operation history is updated. For example, assume a case where a setup error of the "Processing A" is found when a work has advanced to a process of the "Processing B" assuming that the process has been normally completed in the process of the "Processing A" in Step S4 in FIG. 8. If the content of the processing process database is corrected and is set up as a work of a defective product at the point of time when the error is found, it is categorized as a work of the defective product and is displayed as "NG" on the work layout display portion 6 in the process of the "Processing B". Still further, although not illustrated, if the case ID in which a work is held is registered in the work history database and owner information of the case is registered in the case information database, it is possible to notify the owner of the case that the work history has been changed.

Figure 10:
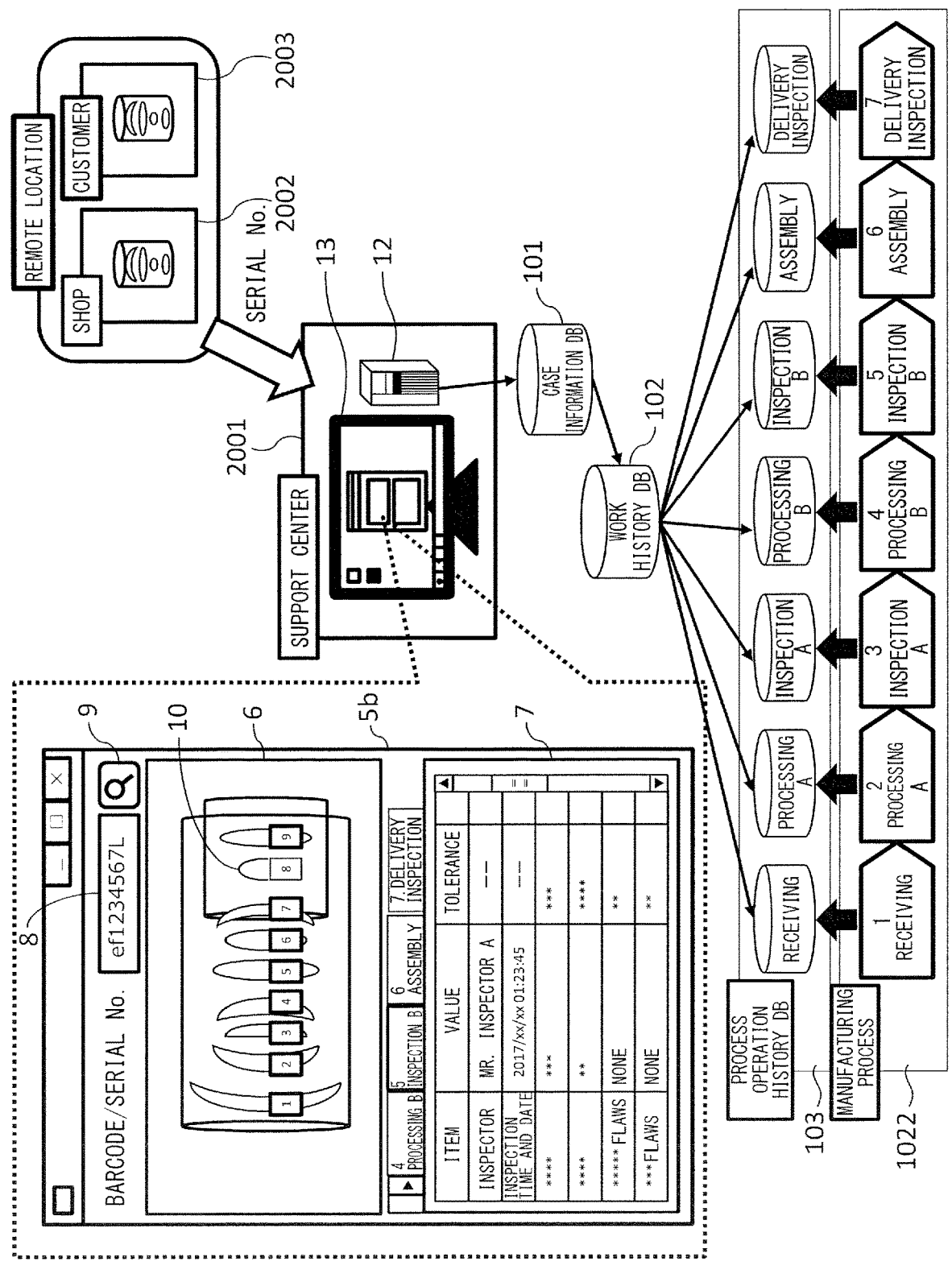
FIG. 10 is a diagram illustrating a display area of a process history of a component to be mounted in a product at a remote location in the embodiment of the present disclosure.

FIG. 10 illustrates an exemplary display of a process history of components to be mounted to a product manufactured at a remote location. In this example, a lens barrel (of an interchangeable lens of a camera) into which a work is assembled or a lens holding unit within a camera are considered to be an inter-process conveyance case, and a serial number of the lens barrel or the lens holding unit will be used as an ID tag (3) of the "case".

In general, a visually recognizable serial number is applied to a product such as the lens barrel of this sort (such as an interchangeable lens of a camera) as an identification code. Therefore, the consummated and delivered product, i.e., the lens barrel, can be considered to be the inter-process conveyance case, and the serial number of the product can be recorded and stored in the case information database 101 as the ID tag (3) of the "case".

By operating the database as described above, the process history databases (101, 102 and 103) can be utilized not only during a production period but also for tracking and investigating the process history of the work, e.g., a lens element, constituting each part of the product after its delivery.

For instance, it is possible to display a production process history of the lens (work) mounted on the lens barrel, i.e., the product. If the serial number can be obtained from a shop 2002 or a customer 2003 and is inputted to the case identification number display portion 8 of the monitor 13 of the computer 12, it becomes possible to search the process history databases (101, 102 and 103). Thereby, it becomes possible to obtain the layout of the lens barrel from the case information database 101 and to display it on the work layout display portion 6. It also becomes possible to obtain the process operation history of the selected work 10 from the process operation history database 103 and to display the history on the process history display portion 7.

Differing from the rectangular display of eighteen boxes of the inter-process conveyance case (2) described above, the work layout display portion 6 in FIG. 10 schematically displays the lens barrel, i.e., the product. In this example, the work layout display portion 6 schematically displays a state in which nine works (lens elements) are stored at one to nine storage positions within the barrel. Accordingly, an operator who repairs or mends the product at a support center (2001) for example can specify the lens barrel, i.e., the inter-process conveyance case, by a terminal including the computer 12 and the monitor 13. In such a case, it is possible to specify the lens barrel by assigning the serial number from the case identification number display portion 8 by utilizing the display mode as illustrated on the left side of FIG. 10. Still further, it is possible to display and to refer to the detailed process history of the work by designating (by clicking or tapping) a problematic lens element (work) for example displayed on the work layout display portion 6.

Figure 13:
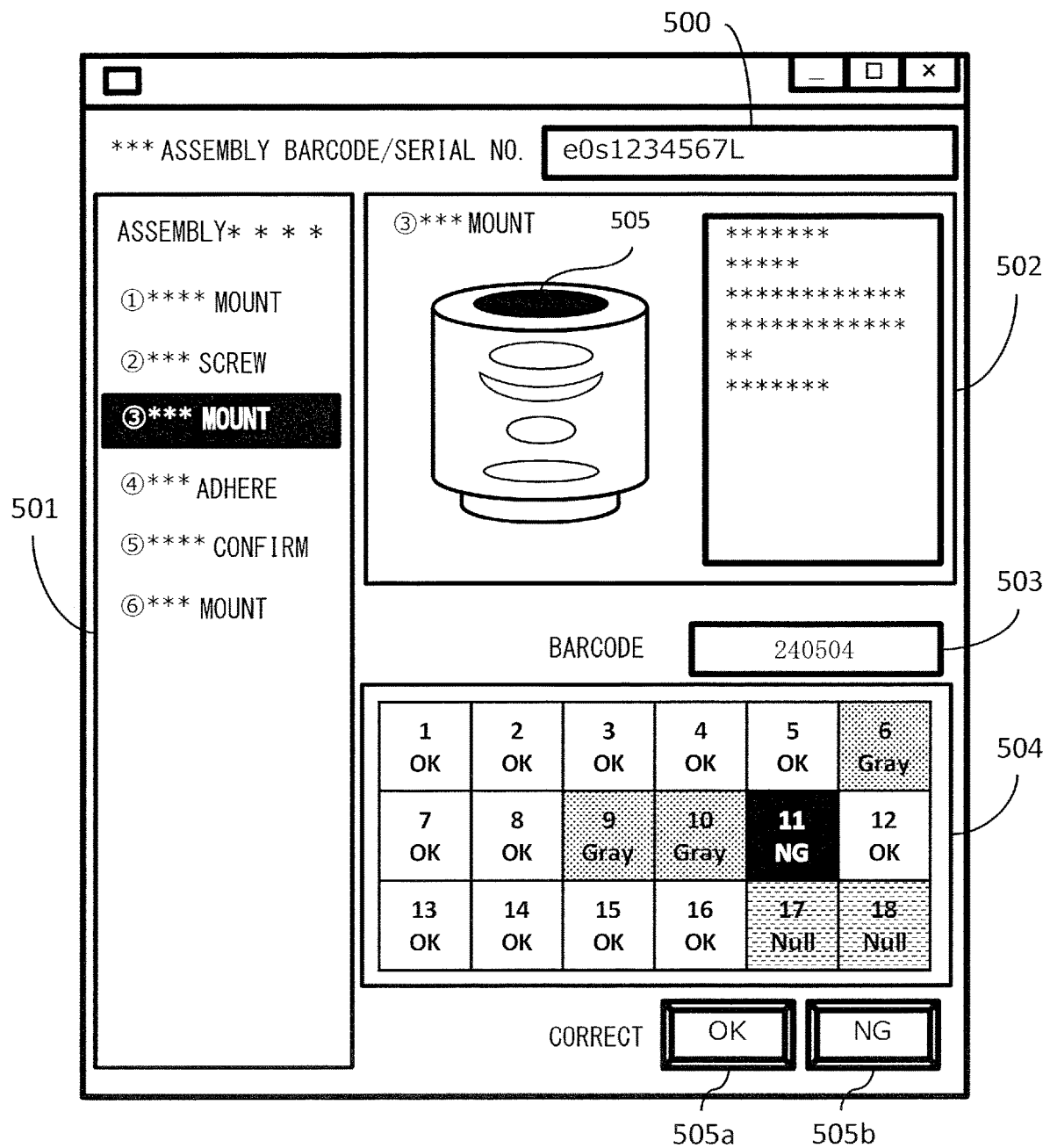
FIG. 13 is a diagram illustrating exemplary display of an assembly procedure and a component layout of the embodiment of the present disclosure.

FIG. 13 illustrates an assembling procedure in an assemble process and an exemplary display of layout of assembled parts. This example illustrates an exemplary display of an assembly process of the lens barrel.

The exemplary display is composed of an assembly procedure display portion 501, an assembly detailed description display portion 502 and an assembly part layout display portion 504. When the barcode of the lens barrel to be assembled is read, the barcode number or the serial number of the lens barrel is displayed on the identification number display portion 500 and, the assembling process procedure is displayed on the assembly procedure display portion 501. That is, the assembly procedure to the lens barrel as the second case is displayed on the monitor 13 as the display unit (assembly procedure display portion 501). When each of the procedure on the assembly procedure display portion 501 is selected, a detailed description of the assembly process is displayed by a drawing and by sentences on the assembly detailed description display portion 502. Then, a component 505 to be assembled is highlighted, the barcode number of the case in which the component is held is displayed on an identification number display portion 503 and is displayed also on the assembly part layout display portion 504.

The assembled parts are categorized by a statistical process as what meets with a standard of good product by any combination and what meets with the standard of good product under a combination condition. The parts within the case are displayed by being classified by sentences and colors to those what can be assembled in the lens barrel (OK), to those what cannot be assembled (NG) and to those what cannot be said to be yes or no (Gray) in the assembly part layout display portion 504. That is, the layout of the entire first case is displayed in the monitor 13 as the display portion, and the user can select the part to be assembled in the lens barrel as the second case from the layout of the entire first case (assembly part layout display portion 504). Still further, in a case where the part is actually assembled to the lens barrel and is different from the contents of the assembly part layout display portion 504, the statistical data meeting with the standard of good product in combination is compensated by correcting the data by correct buttons (505*a* and 505*b*). Still further, defective parts that do not meet with the standard by any combination are stopped from flowing to the post-process by correcting an inspection standard of the inspection process of the previous process.

The search and the display of the reference of the process history of the work composing the lens barrel as the product as described above can be made by the similar control process with the reference of the process history of the work stored in the inter-process conveyance case described above in FIG. 9 and before.

As illustrated in FIG. 10, the product is managed by the database by associating the product with the case used in the manufacturing process, the serial number with the case ID (ID tag), the work mounting position within the product with the work ID, respectively. Thereby, it is possible to make reference to and to display the production history of the specific work within the specific product and to assist repair and mending works of the operator just by finding the serial number. In particular, the database management as illustrated in FIG. 10 makes it possible to refer to the production history of the specific work even if the specific part such as the lens element within the lens barrel is being assembled within the product. That is, the method as illustrated in FIG. 10 makes maintenance works of the product extremely easy because this method makes it possible to refer to and to display the production history of the specific work within the specific product nondestructively just by finding the serial number of the product.

Figure 14:
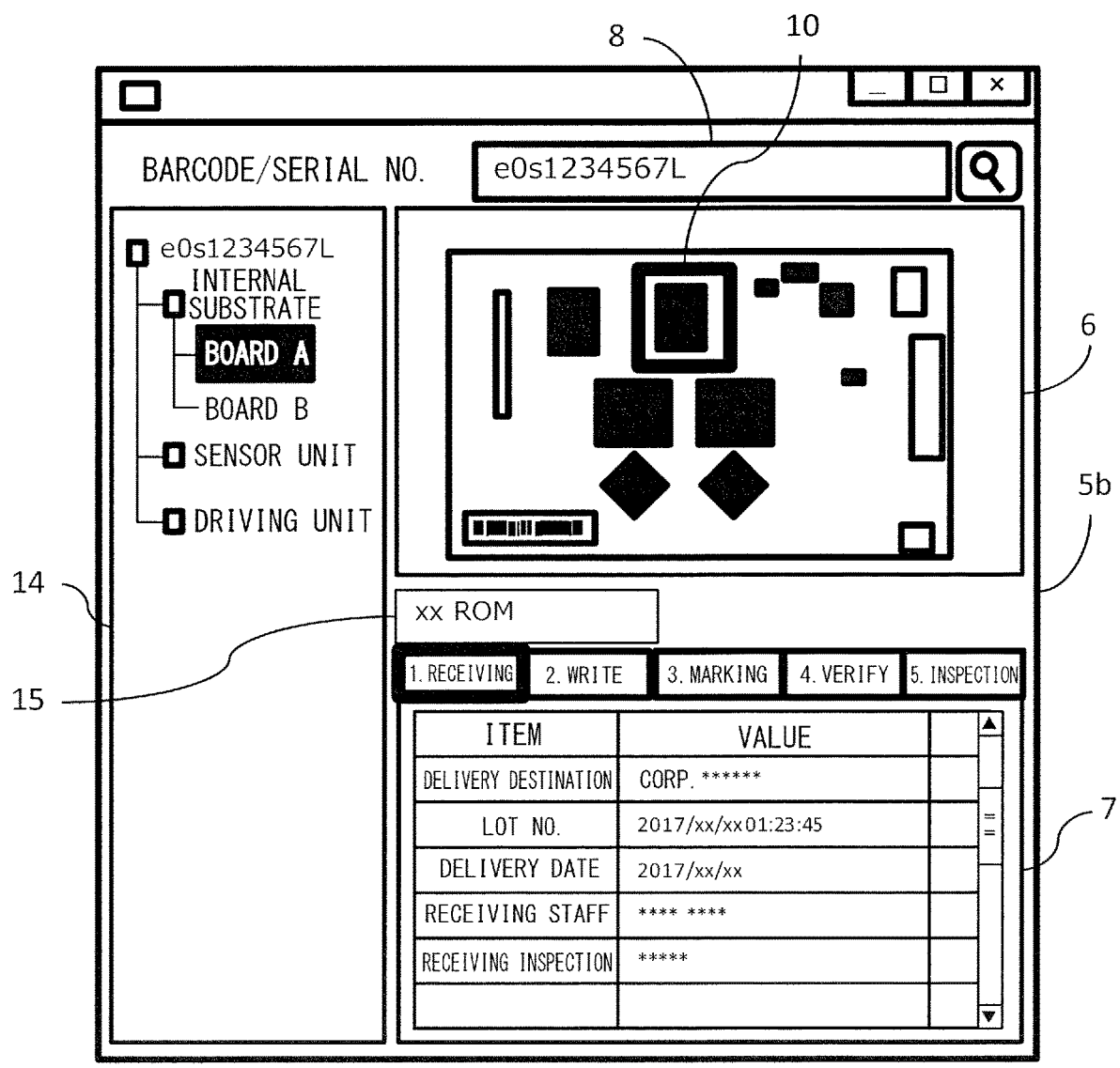
FIG. 14 is a diagram illustrating a display area of referenced contents of a process history, in a case applied to a circuit substrate, of the embodiment of the present disclosure.

It is noted that while the case where the product is the lens barrel has been considered above, the specific product handled in the same manner with the case used in the manufacturing process may be any product other than the lens barrel, and the work to which the mounting position is assigned as the work ID may be any component mounted to the product. For example, it is possible to consider a circuit substrate as the case and to manage a process history of an IC chip mounted on a specific address (work ID) of the circuit substrate. FIG. 14 illustrates an exemplary application of a display area of reference contents of a process history of the embodiment of the present disclosure to the circuit substrate. In a case where a product includes a plurality of circuit substrates and units, a layer display portion 14 may be displayed on the display area. When a serial number of a product is inputted in the case identification number display portion 8 to make a search, a built-in circuit substrate and a unit group are displayed on the layer display portion 14. For instance, if a board A of an internal substrate layer is selected, a circuit layout of the board A is displayed on the work layout display portion 6. When an IC displayed on the work layout display portion 6 is selected, a name of the IC is displayed on a selected part name display portion 15, and a manufacturing process history of the IC can be displayed on the process history display portion 7.

In the case described above, information corresponding to the ID tag, e.g., the serial number and a product code, has been considered to be not applied to the work, e.g., the abovementioned lens element, managed by the work ID associated with the holding (mounting) position. However, the method for managing the work by the work ID associated with the holding (mounting) position described above may be used for a work to which a serial number or a product code for example is being applied.

Figure 15:
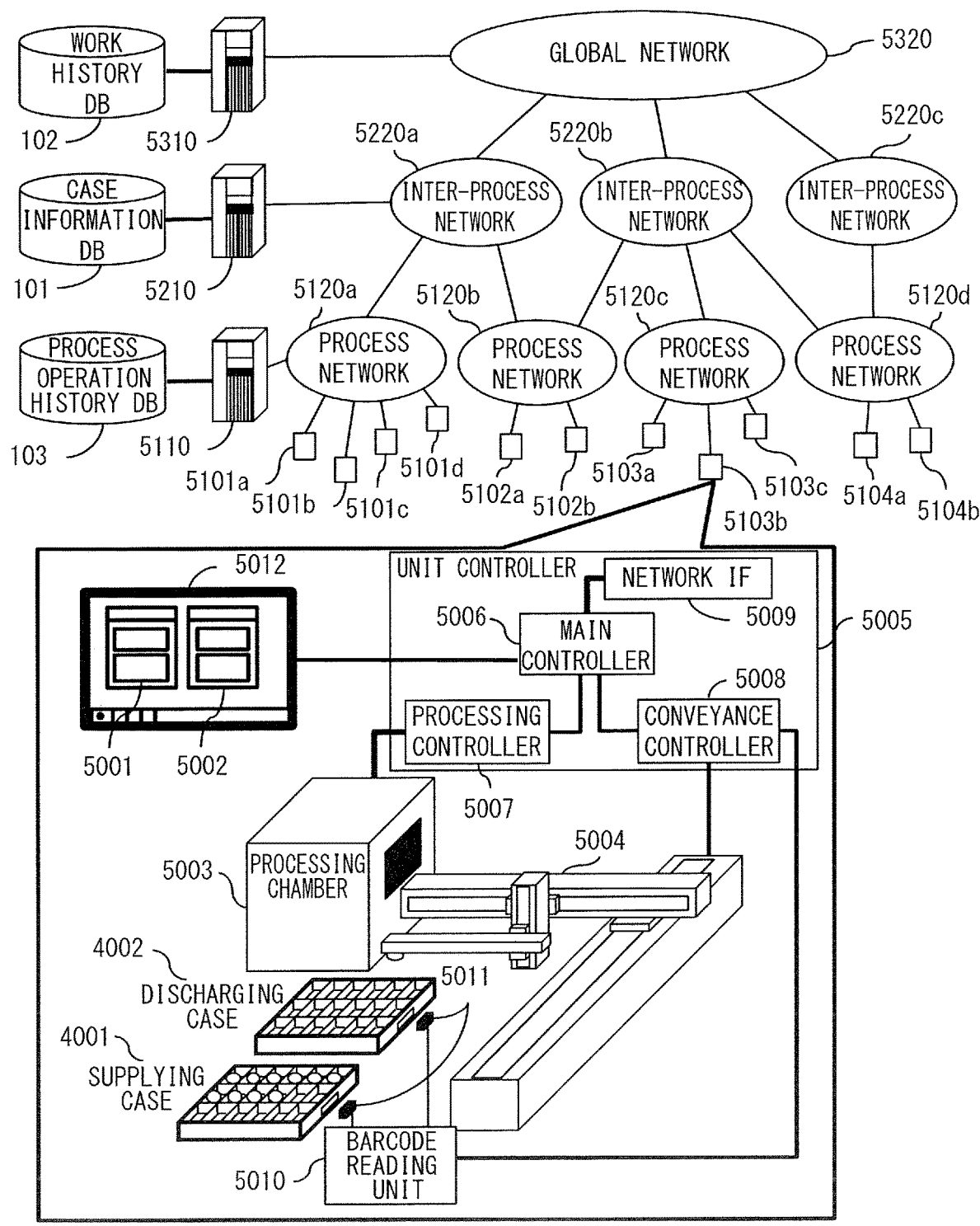
FIG. 15 is a diagram illustrating an exemplary configuration of a network and production units in the production management system of the embodiment of the present disclosure.

FIG. 15 illustrates an exemplary configuration of a network and a production unit of the production management system according to the embodiment of the present disclosure. The process operation history database 103, the case information database 101 and the work history database 102 are managed respectively by database servers (5110, 5210 and 5310) and are layered as a global network, an inter-process network and a process network. The process network is grouped per each process such as a processing A process network 5120a, an inspection A process network 5120b, a processing B process network 5120c and an inspection B process network 5120d. Although not all are illustrated, a database and a database server are connected to each network. Production units (5101a through 5101d) of the processing A process, production units (5102a and 5102b) of the inspection A process, production units (5103a through 5103c) of the processing B process and production units (5104a and 5104b) of the inspection B process are connected with the process network, respectively. FIG. 15 also illustrates a detail of the production unit 5103b of the processing B process at a lower part thereof. A unit controller is composed of a main controller 5006, a processing controller 5007 and a conveyance controller 5008 and is connected with the processing B process network 5120c through a network IF 5009.

When a supplying case 4001 and a discharging case 4002 are set in the unit, barcodes of the cases are read by a barcode reader 5011 and are sent from a barcode reading unit 5010 to the conveyance controller 5008. A reference is made to the case information database 101 from the read barcodes to obtain case IDs and work virtual ID tags, e.g., a palletizing numbers, of the supplying case 4001 and the discharging case 4002. Then, process history screens (5001 and 5002) of individual works held in the supplying case 4001 and the discharging case 4002 are displayed on a monitor 5012 connected with the main controller 5006.

A conveyance robot 5004 is controlled by the conveyance controller 5008 so as to convey the works based on information, e.g., teaching information or palletizing numbers, obtained from the case information database 101. The conveyance robot 5004 conveys the works from the supplying case 4001 to a processing chamber 5003. The processing chamber 5003 is controlled by the processing controller 5007, and a processing process history is stored in the process operation history database 103. An address (link information) of the recorded process history data is additionally recorded in the work history database. The work which has been processed by the processing chamber 5003 is stored in a holding position of a specific palletizing number of the specific discharging case 4002 by the robot unit or the like. Then, corresponding to the work storage operation, the case information database 101 is updated by the work virtual ID tag that corresponds to the case ID of the discharging case 4002 and the holding position of the palletizing number.

Figure 12:
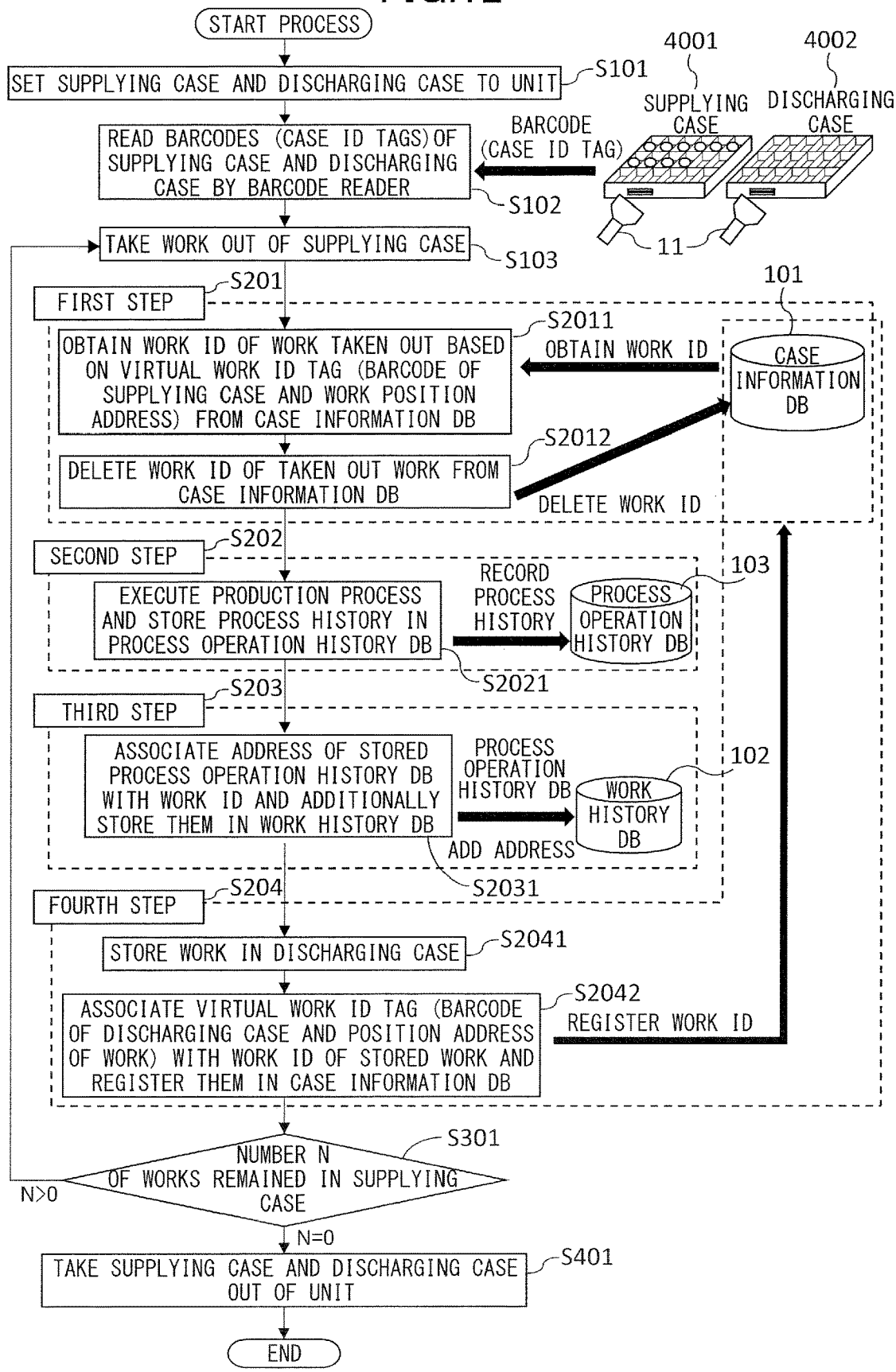
FIG. 12 is a flowchart illustrating a control procedure of the database controller in the production management system of the embodiment of the present disclosure.

FIG. 12 illustrates a flow of the database control (management) executed corresponding to the advance of the manufacturing processes of a certain production line (system) by the abovementioned process history databases (101, 102 and 103) or more specifically by the database unit (server) mounting the database. The control procedure in FIG. 12 can be described as a control program executed by the CPU 1601 (see FIG. 11) of the database unit (server) mounting the process history databases (101, 102 and 103) for example. The control program can be stored in the external storage unit 1604 in FIG. 11 or in the storage unit (of the EEPROM domain for example) of the ROM 1602.

In the procedure in FIG. 12, the supplying (I) and discharging (O) inter-process conveyance cases (4001 and 4002) are used in a certain manufacturing process. Then, FIG. 12 illustrates a state in which the works (group) are transferred from the supplying (I) inter-process conveyance case (4001) to the discharging (O) inter-process conveyance case (4002). In this example, N works are stored in the supplying (I) inter-process conveyance case (4001), and the pertinent manufacturing process is carried out on all of the works. After that, the works which have gone through the process are shifted to the discharging (O) inter-process conveyance case (4002).

In Step S101 in FIG. 12, the supplying (I) and discharging (O) inter-process conveyance cases (4001 and 4002) are set at predetermined positions of the production unit manually by operators or by automatic operations programmed in the robot unit included in the production system. Suppose that a plurality of works is already held in the supplying (I) inter-process conveyance case (4001) in advance.

In Step S102, the ID tags (case IDs) of the supplying (I) and discharging (O) inter-process conveyance cases (4001 and 4002) are read through the reading unit. This reading process is carried out manually by the operator or by the automatic operation programmed in the robot unit included in the production system by using the barcode reader 11 described above as the reading unit.

In Step S103, the works are taken out of the supplying (I) inter-process conveyance case (4001), and the pertinent manufacturing process is carried out in first through fourth steps (5201 through 5204). Then, in synchronism with the progress of the manufacturing process, its process history is recorded in the process history databases (101, 102 and 103). It is noted that while the first through fourth steps are denoted as Steps 5201 through 5204 in FIG. 12, the first through fourth steps are defined for convenience and do not always coincide with the processing steps denoted by "Step Sxxx" described above.

In the first step S201, a reference is made to the case information database 101 by using the case ID of the supplying (I) inter-process conveyance case (4001) and the work virtual ID tag, e.g., the palletizing number, in Step S2011. Then, corresponding to the work take-out process in Step S103, the work ID of the pertinent work held in a holding position of the work virtual ID tag of the pertinent case in the case information database 101 is deleted in Step S2012.

In the second step S202, the manufacturing process is executed by the robot unit and others, and a process history corresponding to the contents of the process is recorded in the process operation history database 103 in Step S2021.

In the third step S203, the address of the process history data recorded in the process operation history database 103 by the robot unit or the like is additionally recorded in the work history database 102 in Step S2031.

In the fourth step S204, the works whose processes have been finished are stored in holding positions of specific palletizing numbers of the discharging (O) inter-process conveyance case (4002) in Step S2014. Then, corresponding to this work storage operation, the case information database 101 is updated by using the case ID of the discharging (O) inter-process conveyance case (4002) and the work virtual ID tag corresponding to the holding position of the palletizing number in Step S2042. Here, the pertinent record of the case information database 101 is changed (or created) by associating with the work virtual ID tag of the case ID of the displaying (0) inter-process conveyance case (4002).

In Step S301, it is determined whether all of the N works held in the beginning in the supplying (I) inter-process conveyance case (4001) have been processed. This determination can be made by comparing with zero after decrementing a counter (N) that counts a work remaining number by one at the position of the Step S301 for example. In a case where an unprocessed work is left yet in the supplying (I) inter-process conveyance case (4001) and not all of the N works have been processed, the process returns from Step S301 to Step S103 to repeat the abovementioned processing. In a case where all of the first N works have been processed, the process advances from Step S301 to Step S401 to take the supplying (I) and discharging (O) inter-process conveyance cases (4001 and 4002) out of the predetermined positions of the production unit.

According to the control illustrated in FIG. 12, the works taken out of the supplying (I) inter-process conveyance case (4001), i.e., the first case, undergo the process operation and are then held in the discharging (O) inter-process conveyance case (4002), i.e., the second case. In such a case, the following first through third database information are updated appropriately corresponding to the process history and switching of the works to the other case in the work process history databases (101, 102 and 103).

(1) First database information corresponding to the virtual work ID tag including the case ID of the first case and the holding position address of the specific work within the first case;

(2) Second database information recording the process history of the process operation executed on the specific work; and (3) Third database information corresponding to the virtual work ID tag associating the case ID of the second case into which the specific work is held with the holding position address of the specific work within the second case.

By the control as illustrated in FIG. 12, it is possible to successively update the process history databases (101, 102 and 103) by the executed process history in synchronism with the progress of the manufacturing process. Still further, at that time, the virtual work ID tag (corresponding to the work holding position address such as the palletizing number) within the supplying (I) and discharging (O) inter-process conveyance cases (4001 and 4002) is appropriately updated corresponding to the transfer of the work. This arrangement makes it possible for the operator, the manager or a staff of the support center (2001) illustrated in FIG. 10 to refer to the database by using the display area of the monitor (13) as described above. That is, it is possible to infallibly refer to the process history of the specific work stored in the specific case (or a product).

As described above, according to the production management system of the present embodiment, it is possible to readily handle a work even if the work is an optical element (lens) to which no ID tag can be directly attached. The production management system of the present embodiment stores holding positions in which a plurality of works are held and work IDs identifying each work, in association with each other, in the holding unit including the first and second cases (I, O) capable of holding the plurality of works, respectively. For instance, the ID tag is applied to the case (inter-process conveyance case), and the work within the case is managed by the work ID associated with the holding position address of the specific work within the case. Then, in a case where information of the holding position associated with the work ID in the storage unit (302) is changed from a first position to a second position, the information of the holding position associated with the work ID in the storage unit is changed from the first position in the first case to the second position. Still further, in a case where the work is held newly at a third position in the second case, the information of the holding position associated with the work ID in the storage unit is changed from the first position to the second or third position. In addition to that, the storage unit (102) stores the work ID and information on a process executed on the work in association with each other, and the controller (1601) is configured to store the work ID and the information on the process executed on the work in the storage unit by associating them with each other based on the information on the holding position. It is noted that the process information includes information such as the process condition.

For instance, assume a case where a first work is moved from a second position to a fourth position different from the second position after moving the first work from the first position to the second position. At this time, the controller (1601) stores information on processes carried out during when the first work is taken out of the first position until when the first work is held newly in the second position in the storage unit (102) while associating with the work ID of the first work based on that the information is associated with the first position in the storage unit (302). Still further, the controller (1601) stores information on processes carried out during when the first work is taken out of the second position until when the first work is held newly in a position different from the second position in the storage unit (303) while associating with the work ID of the first work based on that the information is associated with the second position in the storage unit (302).

This arrangement makes it possible to manage the process history of the individual specific work, to which no ID tag can be directly attached, by the work process history databases (101, 102 and 103). The palletizing number used in teaching data of a robot unit handling a case or a work for example may be used as the virtual work ID tag or as the holding position address of the specific work within the case in particular.

That is, the present embodiment permits to deal with a work to which no ID tag can be directly attached. For instance, it is possible to adequately manage a production history per work in a production system in which products are manufactured in a condition in which works whose production processes are different per work are held in one holding case. Accordingly, the operator or the manager can refer to the production history managed by the database through the display through an adequate display output.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-250193, filed Dec. 26, 2017, and Japanese Patent Application No. 2018-216417, filed Nov. 19, 2018 which are hereby incorporated by reference herein in their entirety.

What is claimed is:

1. A production management method of managing a history of processes of a plurality of works in a production line in which the processes on the works are executed by using a case capable of holding a plurality of works, the production management method comprising:
providing a case ID tag physically attached to the case and enabling to identify a specific case, and a work process history database recording a production process history per work;
managing the history of the processes concerning each work by using the case ID identifying the case ID tag recorded in the work process history database and a work ID associated with a holding position of the work within the case;
storing information on a process executed until when a first work is taken out of a first position and is held anew in a second position in association with the work ID of the first work based on the stored information that the work ID of the first work is associated with the first position in the storage unit, and
storing information on a process executed until when the first work is taken out of the second position and is held anew in the position different from the second position in association with the work ID of the first work based on the stored information that the work ID of the first work is associated with the second position in the storage unit.

2. A production management system comprising:
a storage unit configured to store a holding position at which a first work is held among multiple holding positions of multiple cases including first and second cases respectively capable of holding a plurality of works and a work ID identifying the first work in such a manner that the holding position and the work ID of the first work are associated each other; and
a controller configured to change information of the holding position associated with the work ID of the first work in the storage unit from a first position to a second position if, within the first and second cases, the first work held at a first position is held anew in a second position different from the first position,
wherein the storage unit associates and stores the work ID of the first work and information on a process executed on the first work, and
the controller causes the storage unit to store, in association, the work ID of the first work and the information on the process executed on the first work based on the stored information of the holding position of the first work,
wherein the controller is configured to:
store information on a process executed until when the first work is taken out of the first position and is held anew in the second position in association with the work ID of the first work based on the stored information that the work ID of the first work is associated with the first position in the storage unit, and
store information on a process executed until when the first work is taken out of the second position and is held anew in the position different from the second position in association with the work ID of the first work based on the stored information that the work ID of the first work is associated with the second position in the storage unit.

3. The production management system according to claim 2, wherein the information on the process includes abnormal information of abnormalities in the process.

4. The production management system according to claim 3, further comprising a display unit configured to display the holding position in the storage unit,
wherein the display unit displays an abnormality to indicate a holding position in the storage unit associated with a work ID including an abnormal information in a history of a process information stored in the storage unit.

5. The production management system according to claim 2, wherein the storage unit stores, in association, case IDs of the first and second cases and the information on positions in which works are held in the first and second cases.

6. The production management system according to claim 5, wherein case ID tags identifying the case IDs are physically attached to the first and second cases, respectively.

7. The production management system according to claim 6, further comprising:
a display unit; and
a reading unit configured to read identification information of the case ID tags,
wherein the display unit is configured to display information corresponding to a case having the identification information read by the reading unit.

8. The production management system according to claim 2, wherein the storage unit constitutes a part of a database unit connected to a network together with a production unit carrying out the process to be executed on the first work.

9. The production management system according to claim 2, further comprising a display unit configured to display the holding positions in the storage unit; and
an input unit enabling to select the holding positions in the storage unit,
wherein the display unit is configured to display a history of process information stored in the storage unit while being associated with a work ID associated with a selected holding position in a case where either one of the holding positions is selected.

10. The production management system according to claim 9, wherein the display unit displays a layout of a whole case including the holding positions, and
wherein the display unit displays the history of the process information together with the layout of the whole case.

11. The production management system according to claim 2, wherein the second case is a lens barrel, a lens holding unit within a camera or a circuit substrate.

12. An interchangeable lens comprising:

a lens manufactured based on the production management system according to claim 2; and
a lens barrel configured to hold the lens.

13. A camera, comprising:
a lens manufactured based on the production management system according to claim 2; and
a lens holding unit configured to hold the lens.

14. An article comprising a circuit substrate in which an IC chip manufactured based on the production management system according to claim 2 is mounted.

15. A manufacturing method for manufacturing a product by executing processes on a work by using the production management system according to claim 2.

16. The production management system according to claim 2, wherein the controller is configured to change the information of the holding position associated with the work ID which has been associated with the first position in the storage unit from the first position to a third position if the first work held at the first position of a first case is held anew at the third position of a second case.

* * * * *